(12) United States Patent
Kang et al.

(10) Patent No.: US 11,963,152 B2
(45) Date of Patent: Apr. 16, 2024

(54) METHOD AND DEVICE FOR TRANSMITTING PUSCH IN WIRELESS COMMUNICATION SYSTEM

(71) Applicant: LG ELECTRONICS INC., Seoul (KR)

(72) Inventors: Jiwon Kang, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 555 days.

(21) Appl. No.: 17/284,644

(22) PCT Filed: Oct. 31, 2019

(86) PCT No.: PCT/KR2019/014630
§ 371 (c)(1),
(2) Date: Apr. 12, 2021

(87) PCT Pub. No.: WO2020/091470
PCT Pub. Date: May 7, 2020

(65) Prior Publication Data
US 2021/0400649 A1    Dec. 23, 2021

(30) Foreign Application Priority Data

Nov. 1, 2018   (KR) .................. 10-2018-0133165

(51) Int. Cl.
*H04W 72/04*     (2023.01)
*H04W 16/28*     (2009.01)
*H04W 72/044*    (2023.01)

(52) U.S. Cl.
CPC ......... *H04W 72/046* (2013.01); *H04W 16/28* (2013.01)

(58) Field of Classification Search
CPC .......................... H04W 72/046; H04W 16/28
See application file for complete search history.

(56) References Cited

U.S. PATENT DOCUMENTS

| 2014/0018115 A1* | 1/2014 | Zhuang | H04B 7/0456 455/501 |
| 2018/0199328 A1* | 7/2018 | Sang | H04L 5/0048 |
| 2018/0279297 A1* | 9/2018 | Nogami | H04L 1/1887 |

FOREIGN PATENT DOCUMENTS

WO    2018128474    7/2018

OTHER PUBLICATIONS

PCT International Application No. PCT/KR2019/014630, International Search Report dated Feb. 19, 2020, 5 pages.
(Continued)

*Primary Examiner* — Brenda H Pham
(74) *Attorney, Agent, or Firm* — LEE, HONG, DEGERMAN KANG & WAIMEY

(57) ABSTRACT

A method for transmitting, by a user equipment (UE), a Physical Uplink Shared Channel (PUSCH) in a wireless communication system according to an embodiment of the present disclosure includes: receiving a higher layer message including information related to a configuration of a PUSCH (multi-TU PUSCH) transmitted in a plurality of time units, the plurality of time units (TUs) being classified into a plurality of TU groups; receiving a lower layer message related to a spatial relation RS applied to the transmission of the multi-TU PUSCH; determining beams for each of remaining TU groups other than at least one specific TU group of the plurality of TU groups based on the lower layer message; determining a beam for at least one specific TU group based on the beams for each of the remaining TU groups; and transmitting the multi-TU PUSCH based on the determined beams.

17 Claims, 21 Drawing Sheets

(56) References Cited

OTHER PUBLICATIONS

Intel Corporation, "On Beam Management Enhancement," 3GPP TSG RAN WG1 Meeting #94b, R1-1810791, Oct. 2018, 11 pages.

Motorola Mobility, "Introduction of Further Enhanced MTC into 36.213," 3GPP TSG-RAN WG1 Meeting #88, R1-1704128, Feb. 2017, 230 pages.

Huawei et al., "UL SRS design for beam management, CSI acquisition," 3GPP TSG RAN WG1 Meeting #89, R1-1706938, May 2017, 9 pages.

Sony et al., "Metrics for beam correspondence," TSG-RAN Working Group 4 (Radio) meeting #88bis, R4-1813406, Oct. 2018, 5 pages.

* cited by examiner

[FIG. 1]
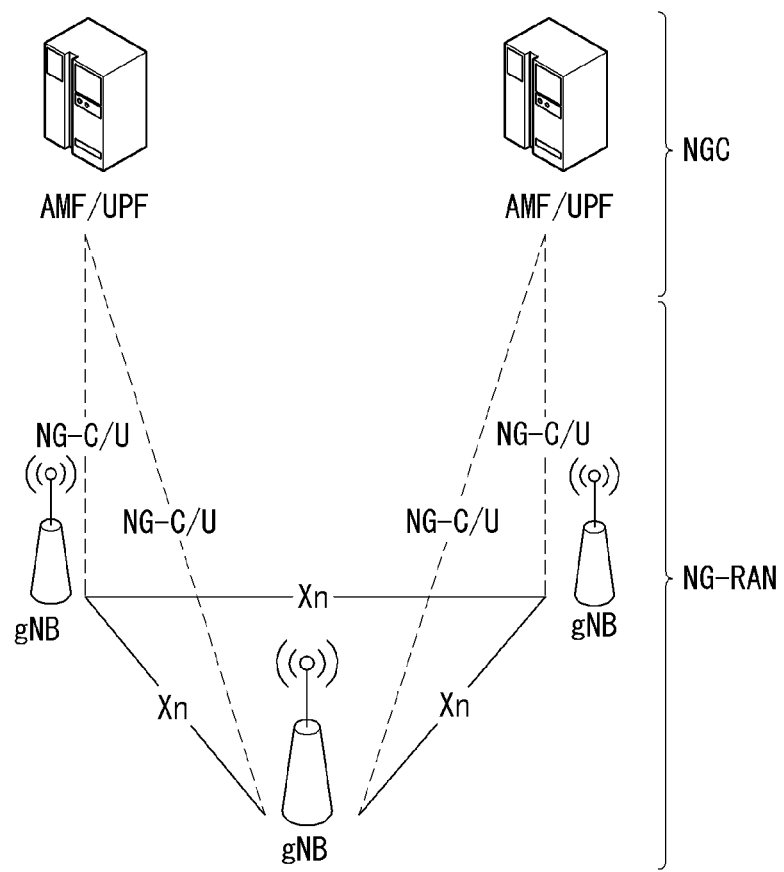

[FIG. 2]
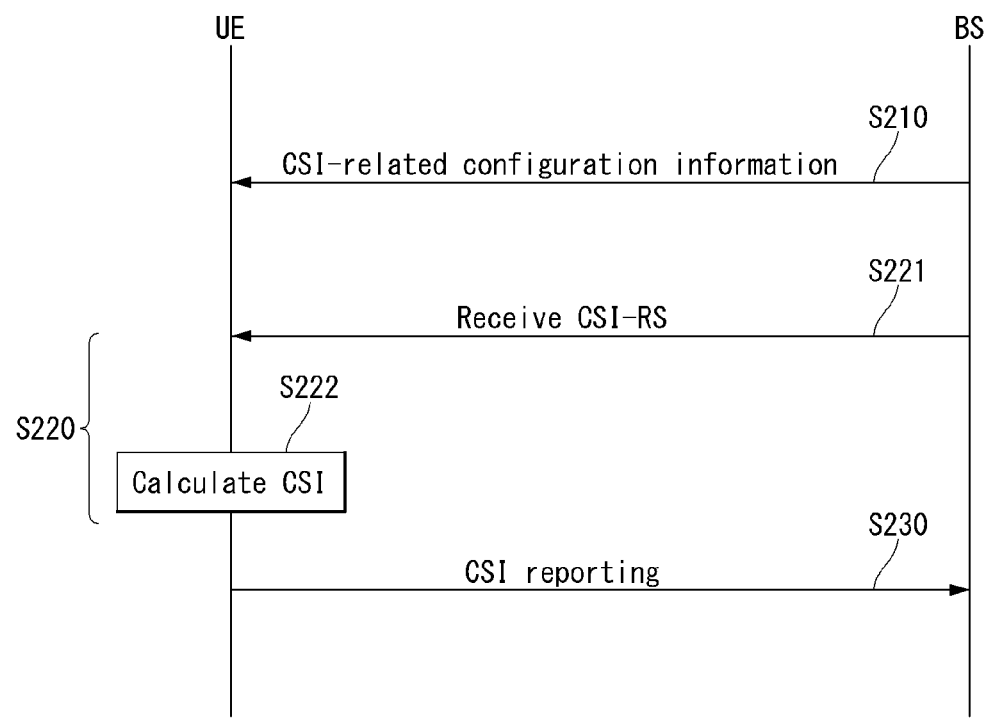

[FIG. 3]
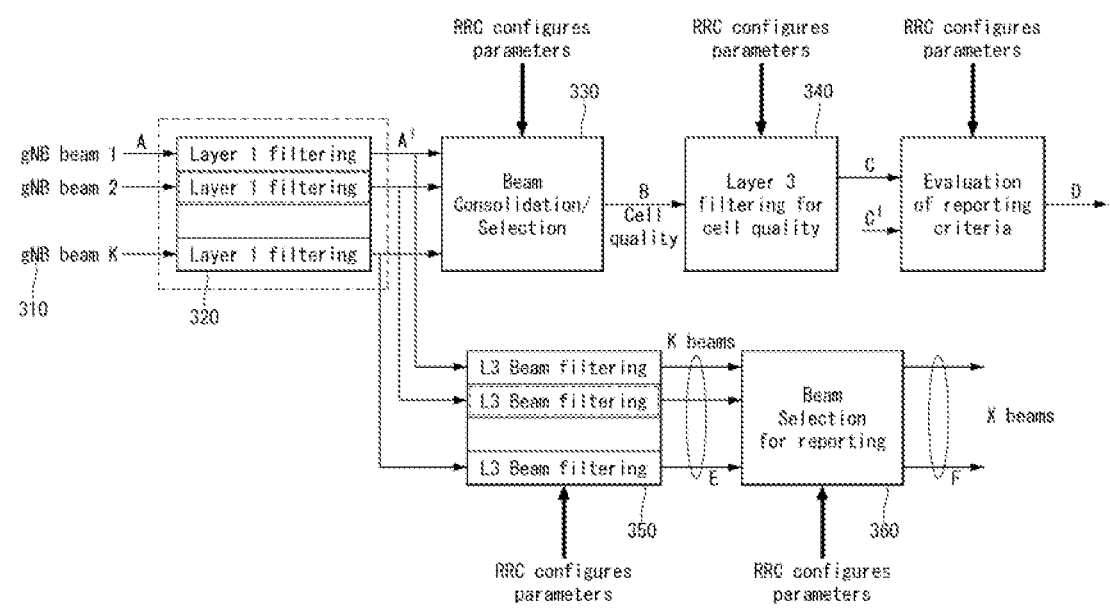

[FIG. 4]
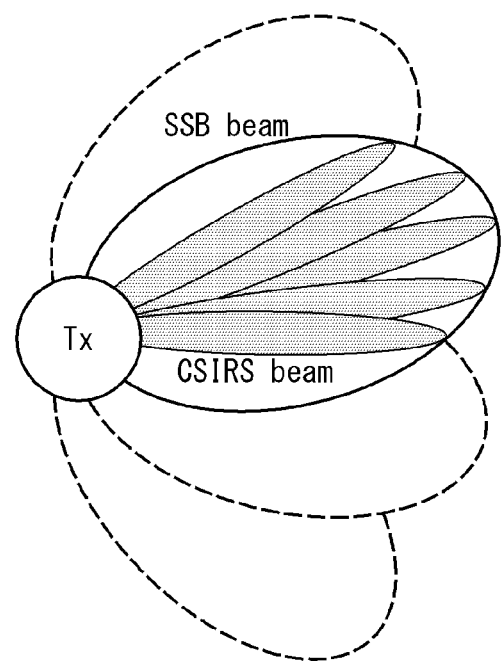

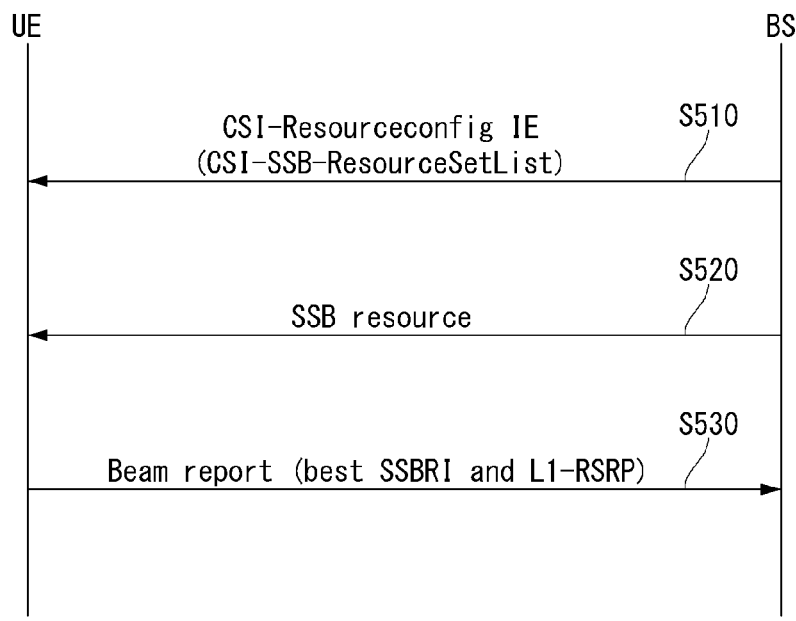
[FIG. 5]

[FIG. 6]
(a)
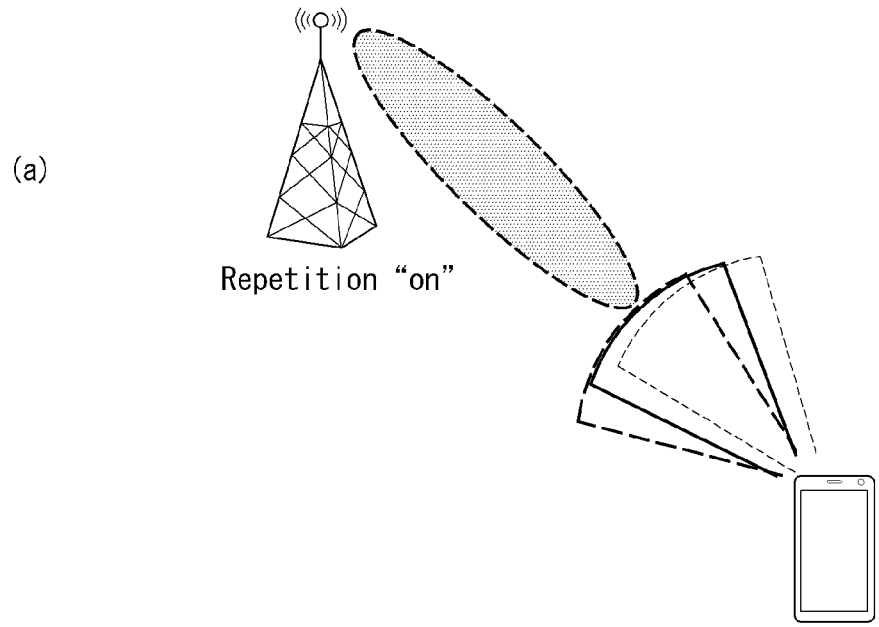
(b)
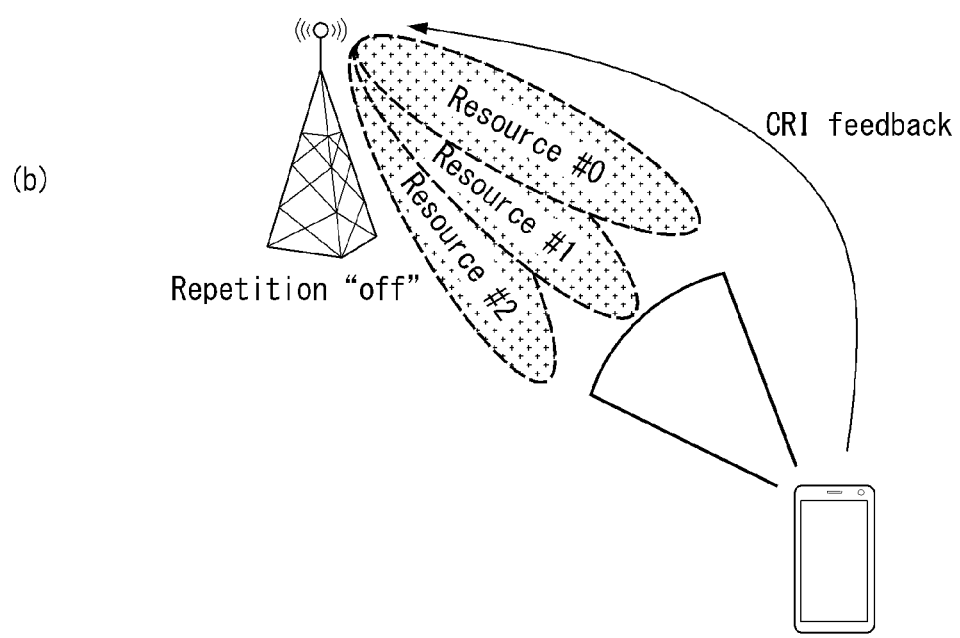

[FIG. 7]
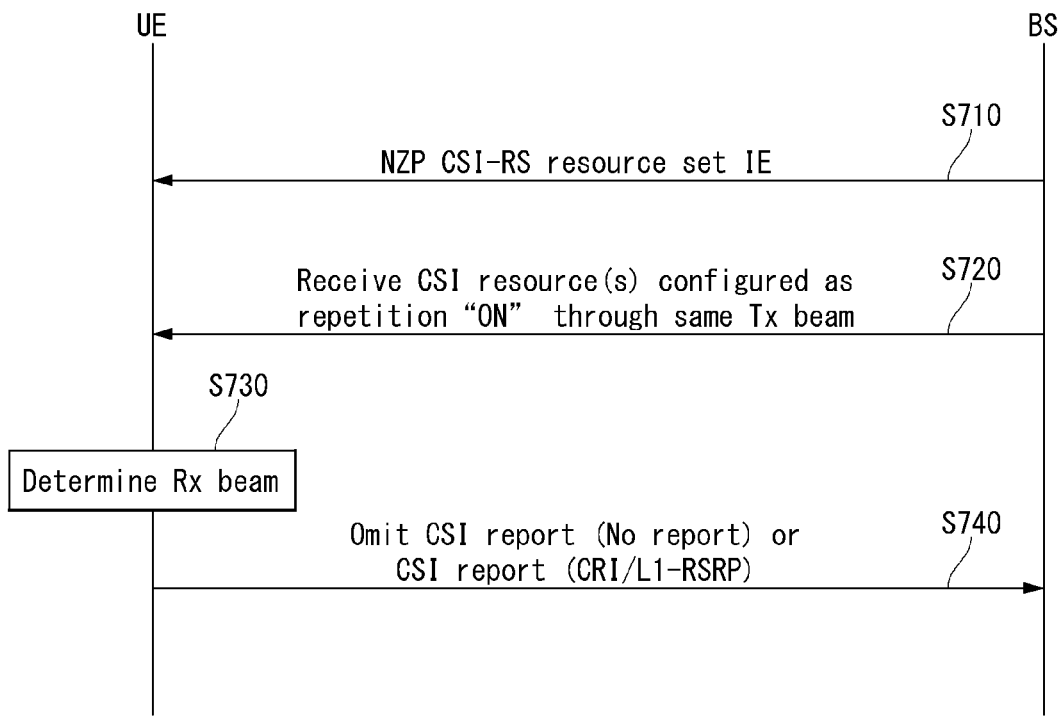

[FIG. 8]
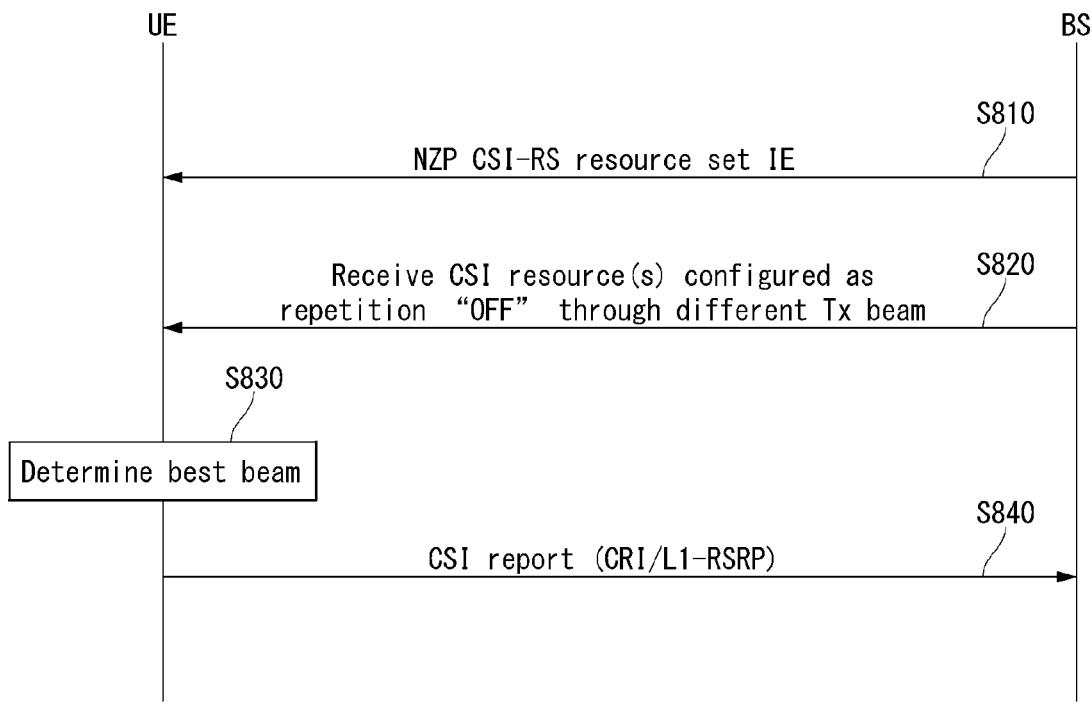

[FIG. 9]
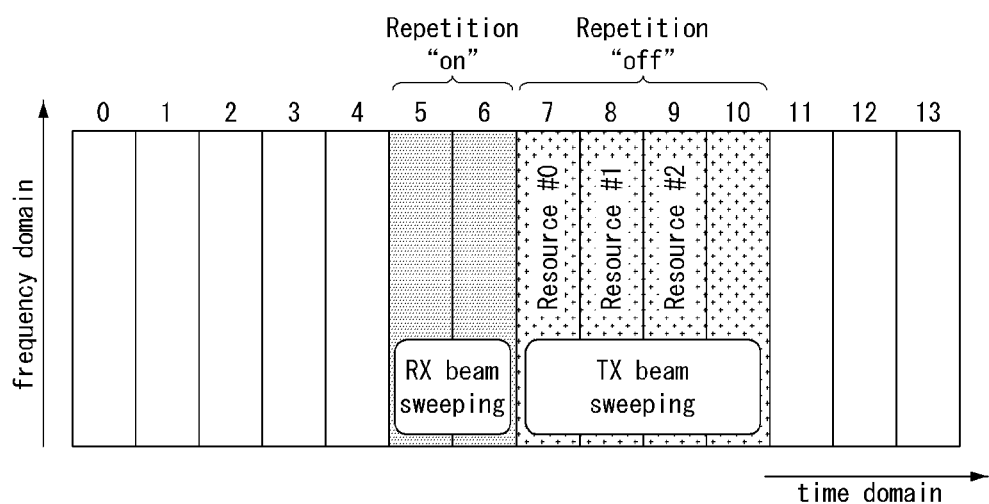

[FIG. 10]
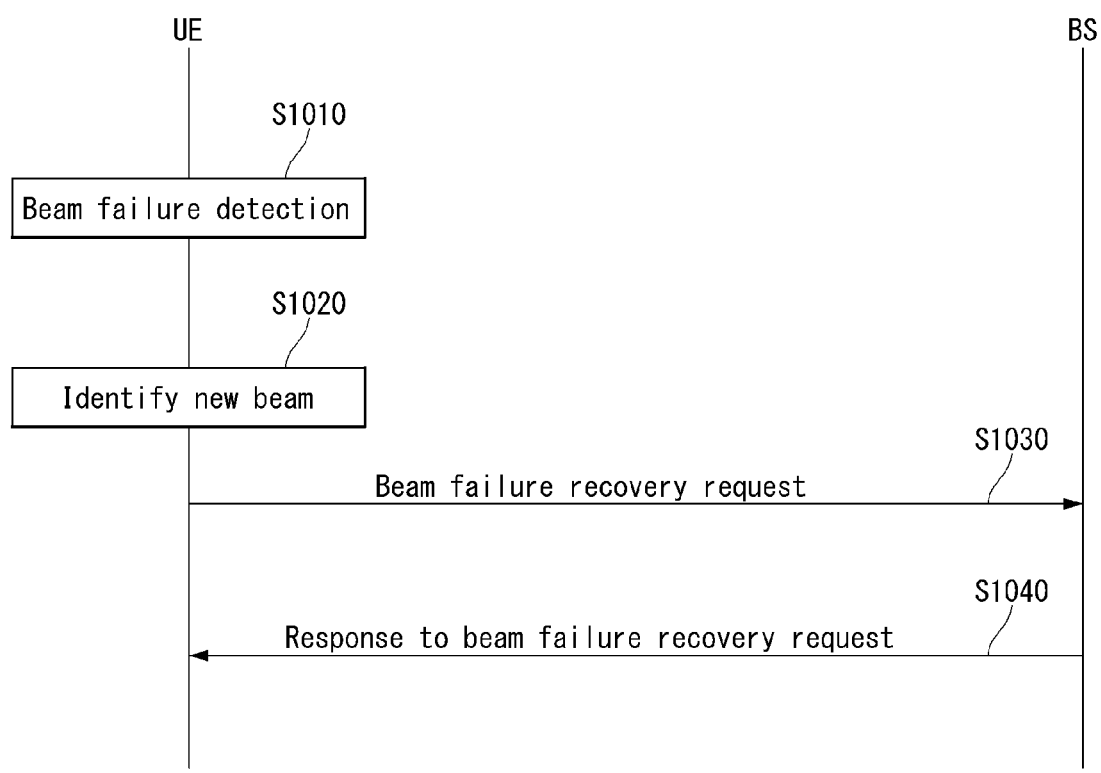

[FIG. 11]
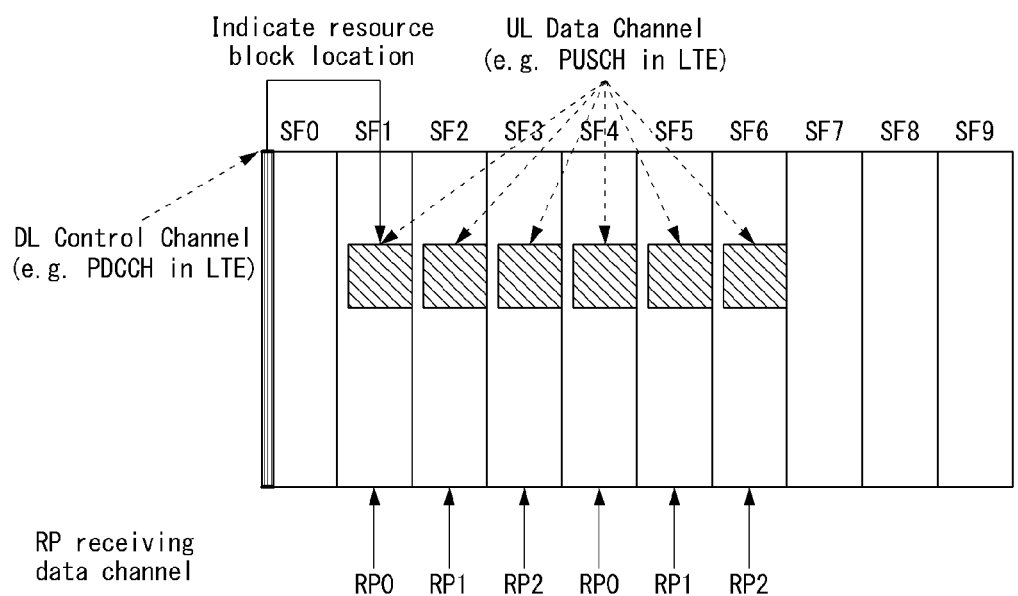

[FIG. 12]
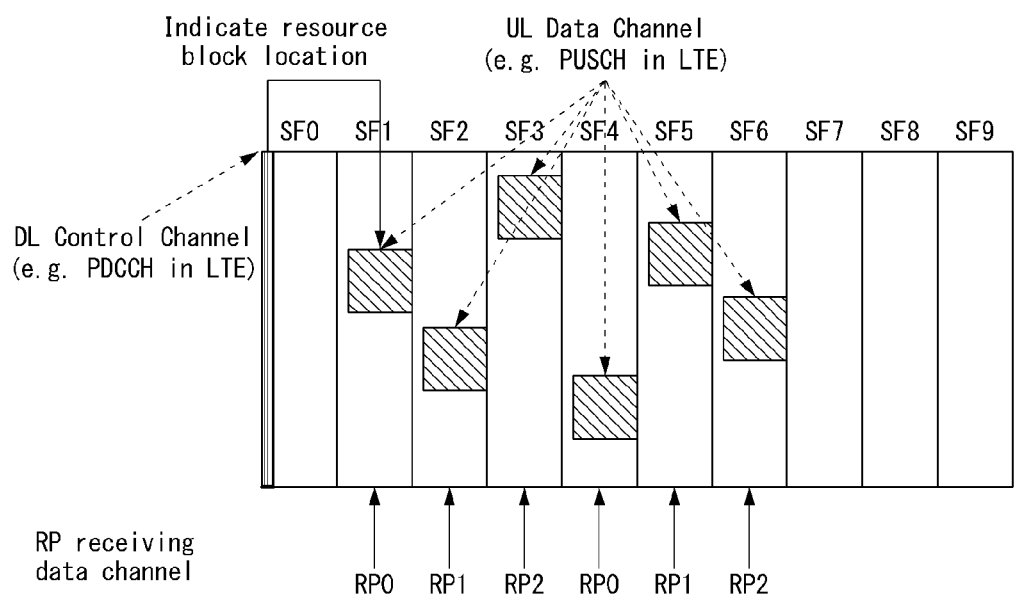

[FIG. 13]
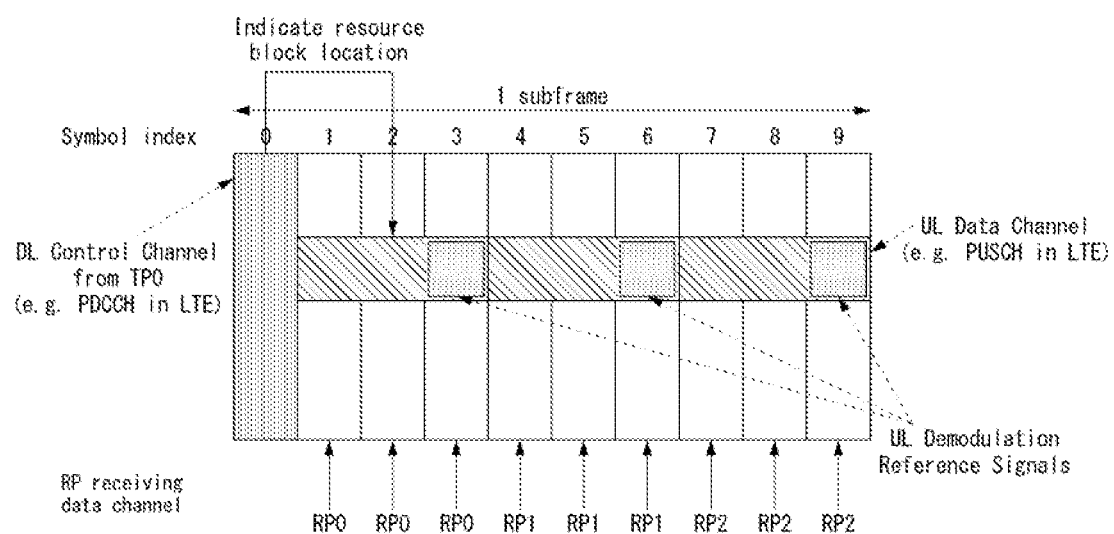

[FIG. 14]
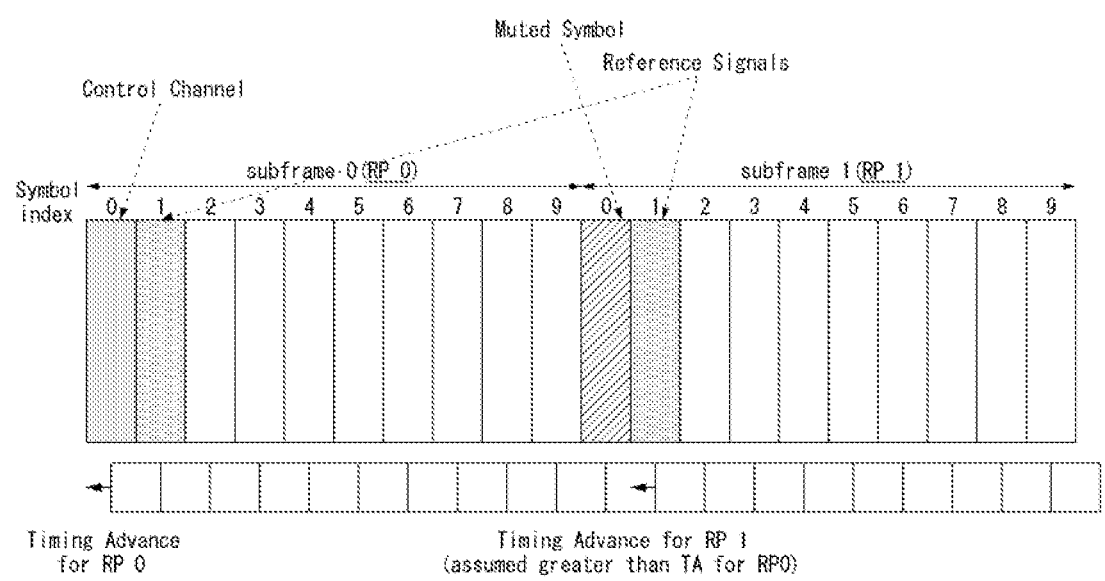

[FIG. 15]
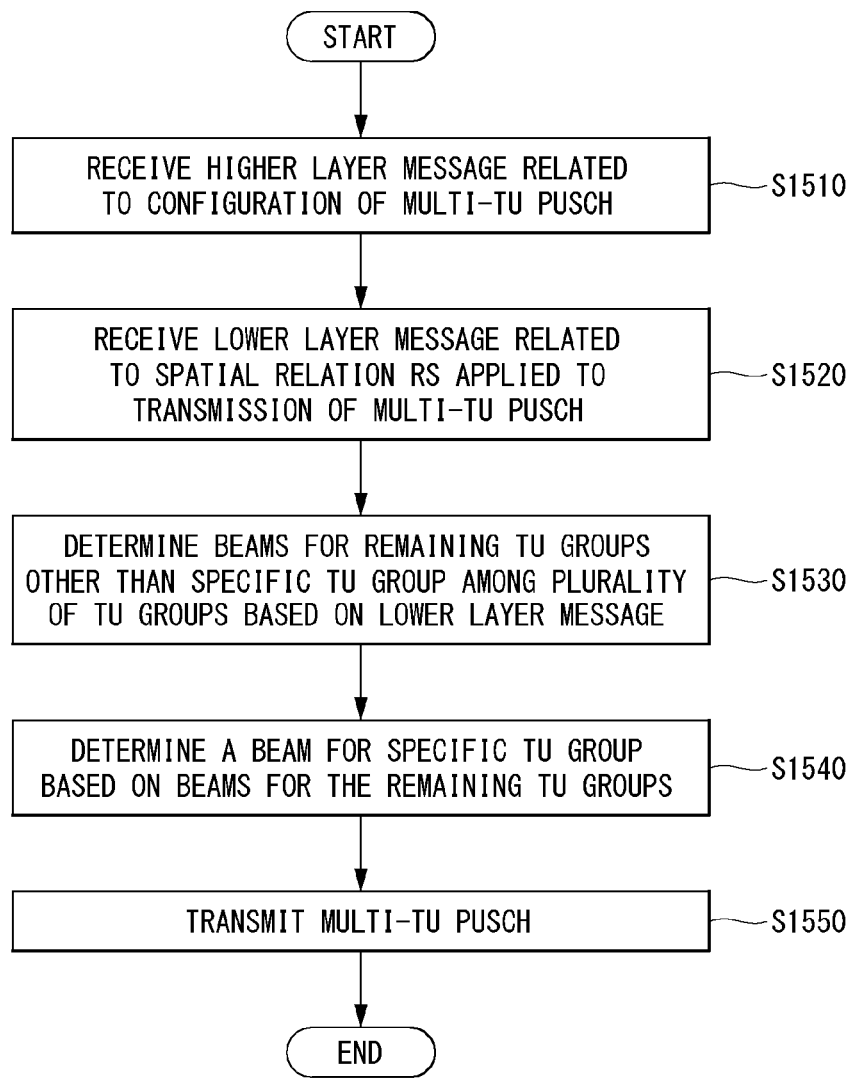

[FIG. 16]
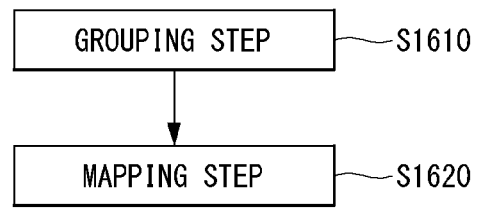

[FIG. 17]
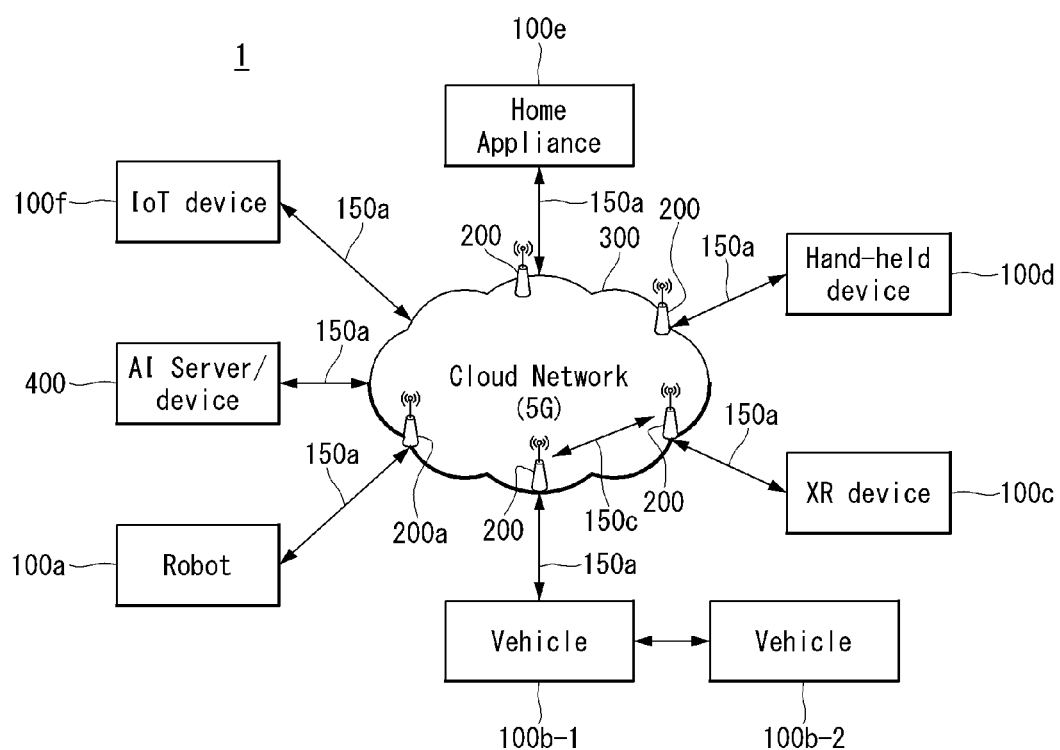

[FIG. 18]
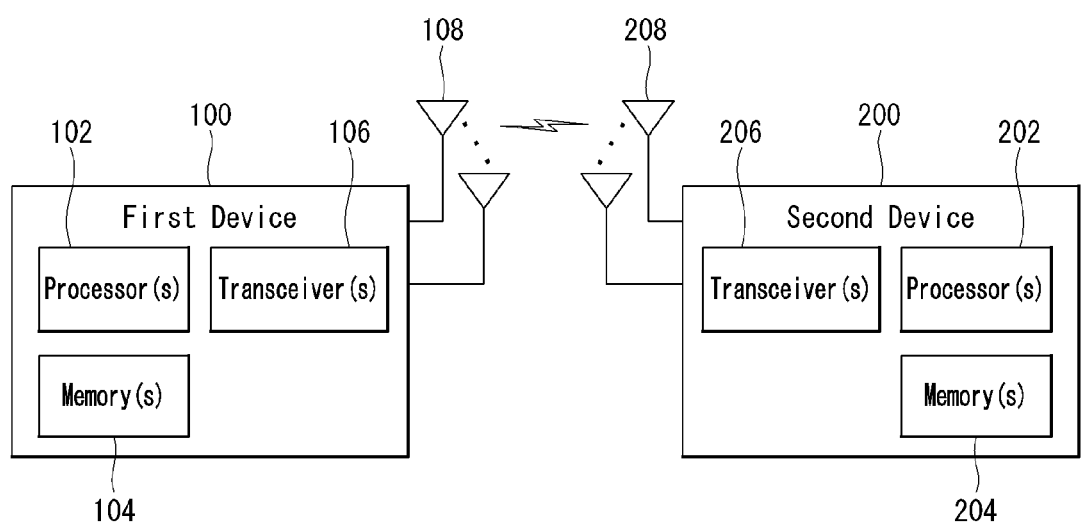

[FIG. 19]
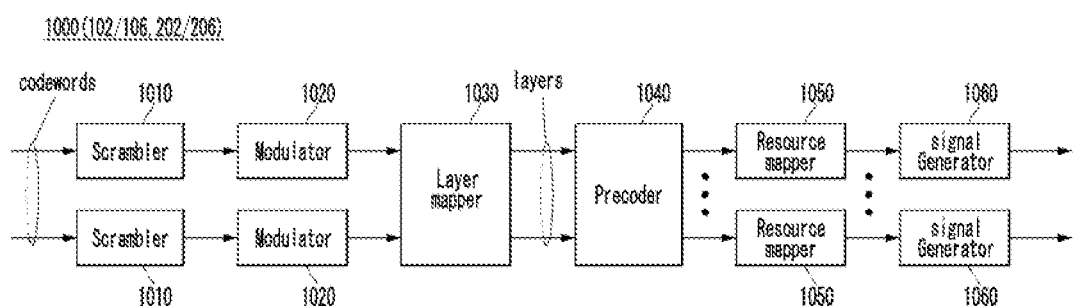

[FIG. 20]
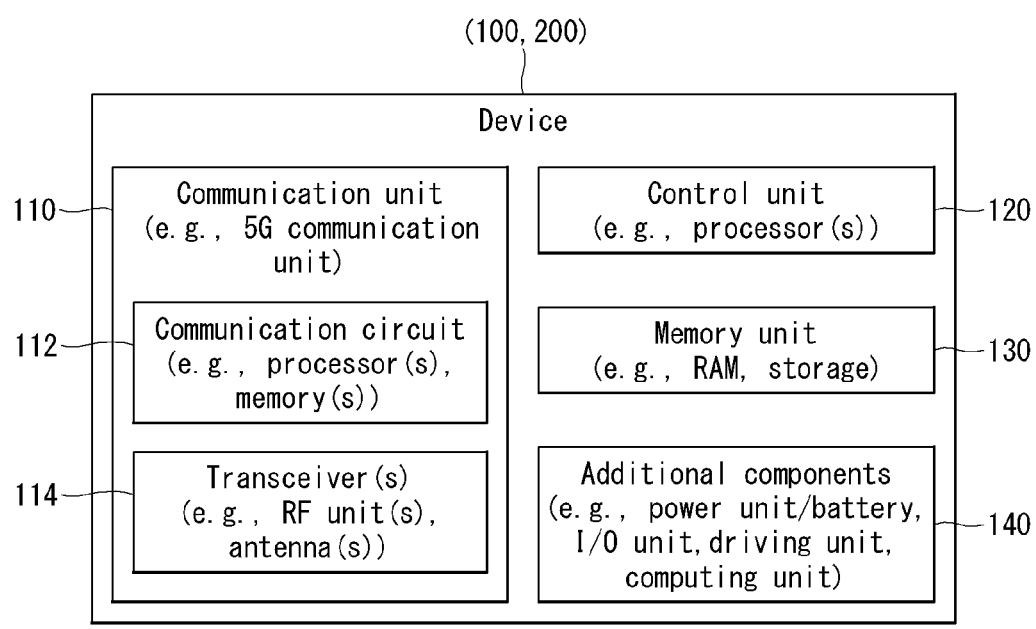

[FIG. 21]
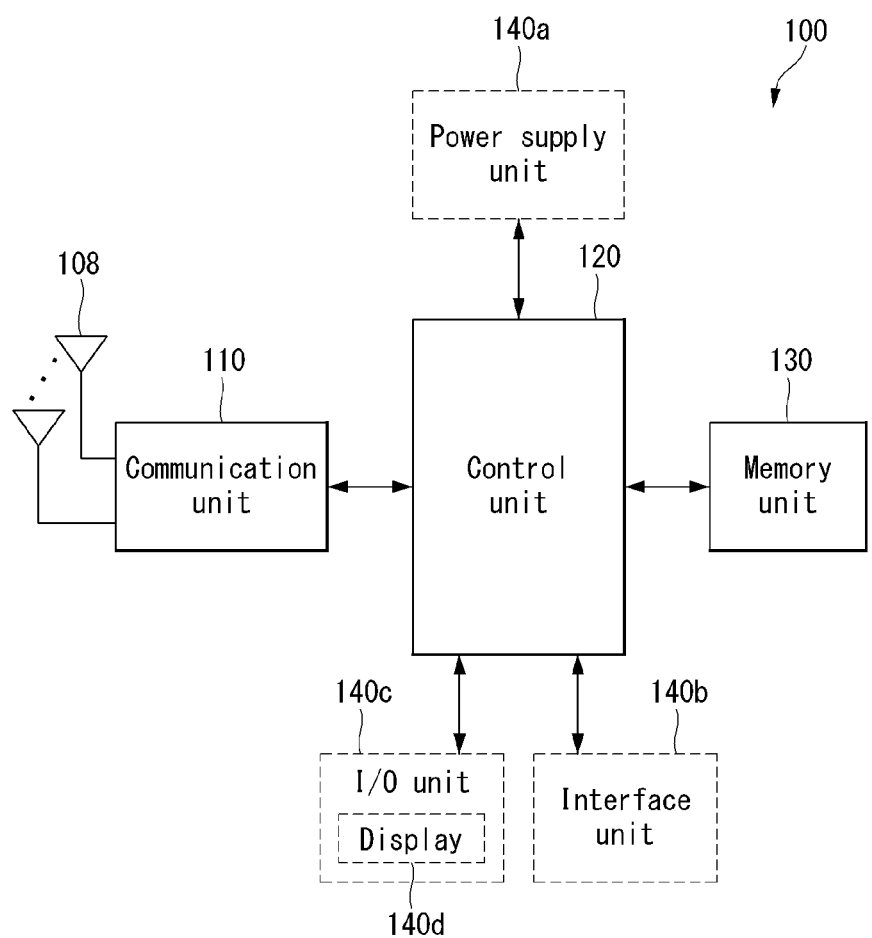

METHOD AND DEVICE FOR TRANSMITTING PUSCH IN WIRELESS COMMUNICATION SYSTEM

CROSS-REFERENCE TO RELATED APPLICATIONS

This application is the National Stage filing under 35 U.S.C. 371 of International Application No. PCT/KR2019/014630, filed on Oct. 31, 2019, which claims the benefit of earlier filing date and right of priority to Korean Application No. 10-2018-0133165, filed on Nov. 1, 2018, the contents of which is incorporated by reference herein in its entirety.

TECHNICAL FIELD

The present disclosure relates to a method and a device for transmitting a PUSCH in a wireless communication system.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method and a device for transmitting a PUSCH in a plurality of time units.

Technical objects to be achieved by the present disclosure are not limited to the aforementioned technical objects, and other technical objects not described above may be evidently understood by a person having ordinary skill in the art to which the present disclosure pertains from the following description.

Technical Solution

A method for transmitting, by a user equipment (UE), a Physical Uplink Shared Channel (PUSCH) in a wireless communication system according to an embodiment of the present disclosure includes: receiving a higher layer message including information related to a configuration of a PUSCH (multi-TU PUSCH) transmitted in a plurality of time units, the plurality of time units (TUs) being classified into a plurality of TU groups; receiving a lower layer message related to a spatial relation RS applied to the transmission of the multi-TU PUSCH; determining beams for each of remaining TU groups other than at least one specific TU group of the plurality of TU groups based on the lower layer message; determining a beam for at least one specific TU group based on the beams for each of the remaining TU groups; and transmitting the multi-TU PUSCH based on the determined beams. The lower layer message includes information indicating at least one spatial relation RS applied to each of the remaining TU groups, and the beam for at least one specific TU group is determined as a preconfigured beam.

The time unit (TU) may be defined as one or a plurality of slots or symbol(s).

The preconfigured beam may be configured as a beam (spatial filter) for at least any one TU group among the remaining TU groups, and a beam satisfying a specific condition.

A difference value in angle of departure between the beam satisfying the specific condition and the beam (spatial filter) for at least any one TU group among the remaining TU groups may be a specific value or is within a specific range.

The beam for each TU group included in the plurality of TU groups among the determined beams may be related to at least one layer of all layers related to the transmission of the multi-TU PUSCH.

The all layers may be classified into a plurality of layer groups including at the at least one layer, and the beam for each TU group may be applied to each layer group among the plurality of layer groups.

The beam for each group may be applied to the all layers.

The method may further include grouping the plurality of time units (TUs) into K TU groups based on the higher layer message.

The higher layer message may include information related to the number N of the plurality of time units (TUs), and the grouping may be performed so that a deviation of the number of TUs which belong to each TU group among the K TU groups becomes minimum based on the number N of the plurality of time units (TUs).

The determined beams may be related to K spatial relation RS sets, and the spatial relation RS set may be comprised of at least one spatial relation RS, and mapped to each TU which belongs to the plurality of time units (TUs).

The mapped spatial relation RS set may be changed for each TU among the plurality of time units (TUs).

The mapped spatial relation RS set may be changed for each TU group which belongs to the K TU groups.

The mapped spatial relation RS set may be changed every at least two TUs among the plurality of time units (TUs).

The higher layer message may further include a plurality of spatial relation states, a constitution of each spatial relation state included in the list may be configured by a multiple access control-control element (MAC CE), and the spatial relation state may be comprised of at least one spatial relation RS applied to the remaining TU groups.

The lower layer message may be Downlink Control Information (DCI), and information indicating the at least one spatial relation RS may be related to any one spatial relation state of the plurality of spatial relation states.

A user equipment (UE) for transmitting a Physical Uplink Shared Channel (PUSCH) in a wireless communication system according to another embodiment of the present disclosure includes: one or more transceivers; one or more processors; and one or more memories operably connectable to the one or more processors, and storing instructions of performing operations when executed by the one or more processors.

The operations include receiving a higher layer message including information related to a configuration of a PUSCH (multi-TU PUSCH) transmitted in a plurality of time units, the plurality of time units (TUs) being classified into a plurality of TU groups, receiving a lower layer message related to a spatial relation RS applied to the transmission of the multi-TU PUSCH, determining beams for each of remaining TU groups other than at least one specific TU group of the plurality of TU groups based on the lower layer message, determining a beam for at least one specific TU group based on the beams for each of the remaining TU groups, and transmitting the multi-TU PUSCH based on the determined beams.

The lower layer message includes information indicating at least one spatial relation RS applied to each of the remaining TU groups, and the beam for at least one specific TU group is determined as a preconfigured beam.

A device according to yet another embodiment of the present disclosure includes: one or more memories; and one or more processors functionally connected to the one or more memories.

The one or more processors are configured to control the device to receive a higher layer message including information related to a configuration of a PUSCH (multi-TU PUSCH) transmitted in a plurality of time units, the plurality of time units (TUs) being classified into a plurality of TU groups, receive a lower layer message related to a spatial relation RS applied to the transmission of the multi-TU PUSCH, determine beams for each of remaining TU groups other than at least one specific TU group of the plurality of TU groups based on the lower layer message, determine a beam for at least one specific TU group based on the beams for each of the remaining TU groups, and transmit the multi-TU PUSCH based on the determined beams.

The lower layer message includes information indicating at least one spatial relation RS applied to each of the remaining TU groups, and the beam for at least one specific TU group is determined as a preconfigured beam.

Advantageous Effects

According to an embodiment of the present disclosure, in relation to a configuration of a PUSCH (multi-TU PUSCH) transmitted in a plurality of time units (TUs), the plurality of TUs are classified into a plurality of groups. A UE determines beams for each of remaining TU groups other than at least one specific TU group of the plurality of TU groups based on a lower layer message, and determines a beam for the at least one specific TU group based on the beams for each of the remaining TU groups. Therefore, even when a spatial relation RS for a specific TU group among the plurality of TU groups is not indicated, the UE can transmit the PUSCH by determining a best beam. Further, since the PUSCH is transmitted through different beams for each TU group, a communication success probability can be increased even when a quality of a link between a specific transmission beam of the UE and the base station deteriorates.

Further, according to an embodiment of the present disclosure, the UE groups the plurality of TUs into K TU groups. The UE performs grouping so as to minimize a deviation between the numbers of TUs which belong to each group which belongs to the K TU groups. Therefore, reliability of the multi-TU PUSCH transmission can be maximized.

Further, according to an embodiment of the present disclosure, beams determined for the transmission of the multi-TU PUSCH are related to K spatial relation RS sets. The spatial relation RS set is comprised of at least one spatial relation RS, and mapped to each TU which belongs to the plurality of time units (TUs). Since the spatial relation RS set is mapped according to a specific rule, the multi-TU PUSCH can be transmitted to suit a UE capability related to a beam switching delay, a power transition time, etc.

Further, according to an embodiment of the present disclosure, a spatial relation RS applied for each TU group can be sequentially indicated through a first message and a second message. Accordingly, a signaling overhead required for the UE to be indicated with the spatial relation RS can be reduced.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an example of an overall structure of an NR system to which a method proposed in the disclosure may be applied.

FIG. 2 is a flowchart illustrating an example of a CSI-related procedure.

FIG. 3 is a concept view illustrating an example of a beam-related measurement model.

FIG. 4 is a diagram illustrating an example of a DL BM procedure-related Tx beam.

FIG. 5 is a flowchart illustrating an example of a DL BM procedure using an SSB.

FIG. 6 is a diagram illustrating an example of a DL BM procedure using a CSI-RS.

FIG. 7 is a flowchart illustrating an example of a received beam determination process of a UE.

FIG. 8 is a flowchart illustrating an example of a method of determining, by a base station, a transmission beam.

FIG. 9 is a diagram illustrating an example of resource allocation in time and frequency domains related to the operation of FIG. 6.

FIG. 10 is a flowchart illustrating an example of a beam failure recovery procedure.

FIGS. 11 and 12 illustrate examples of scheduling for cell cycling uplink transmission according to an embodiment of the present disclosure.

FIG. 13 illustrates an example of performing the cell cycling uplink transmission in units of a symbol group according to an embodiment of the present disclosure.

FIG. 14 illustrates an example of a muting operation during the cell cycling uplink transmission according to an embodiment of the present disclosure.

FIG. 15 is a flowchart for describing a method for transmitting, by a UE, a PUSCH according to an embodiment of the present disclosure.

FIG. 16 is a flowchart for describing TU grouping and mapping operations of a UE according to an embodiment of the present disclosure.

FIG. 17 illustrates a communication system 1 applied to the present disclosure.

FIG. 18 illustrates a wireless device applicable to the present disclosure.

FIG. 19 illustrates a signal processing circuit applied to the present disclosure.

FIG. 20 illustrates another example of a wireless device applied to the present disclosure.

FIG. 21 illustrates a hand-held device applied to the present disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New Radio (NR) is primarily described for clear description, but technical features of the present disclosure are not limited thereto.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Channel State Information (CSI) Related Procedure

In a new radio (NR) system, a channel state information-reference signal (CSI-RS) is used for time/frequency tracking, CSI computation, layer 1 (L1)-reference signal received power (RSRP) computation, and mobility.

"A and/or B" used in the present disclosure may be interpreted as the same meaning as that "A and/or B" includes at least one of A or B."

The CSI computation is related to CSI acquisition, and the L1-RSRP computation is related to beam management (BM).

Channel state information (CSI generally refers to information which may indicate the quality of a radio channel (or also called a link) formed between a UE and an antenna port.

An operation of a UE for a CSI-related procedure is described.

FIG. 2 is a flowchart illustrating an example of a CSI-related procedure.

In order to perform one of uses of a CSI-RS described above, a terminal (e.g., user equipment (UE)) receives, from a base station (e.g., general Node B or gNB), configuration information related to CSI through radio resource control (RRC) signaling (S110).

The configuration information related to the CSI may include at least one of CSI-interference management (IM) resource-related information, CSI measurement configuration-related information, CSI resource configuration-related information, CSI-RS resource-related information, or CSI report configuration-related information.

The CSI-IM resource-related information may include CSI-IM resource information, CSI-IM resource set information, etc.

A CSI-IM resource set is identified by a CSI-IM resource set identifier (ID). One resource set includes at least one CSI-IM resource.

Each CSI-IM resource is identified by a CSI-IM resource ID.

The CSI resource configuration-related information defines a group including at least one of a non zero power (NZP) CSI-RS resource set, a CSI-IM resource set, or a CSI-SSB resource set.

That is, the CSI resource configuration-related information includes a CSI-RS resource set list. The CSI-RS resource set list may include at least one of an NZP CSI-RS resource set list, a CSI-IM resource set list, or a CSI-SSB resource set list.

The CSI resource configuration-related information may be represented as a CSI-ResourceConfig IE.

The CSI-RS resource set is identified by a CSI-RS resource set ID. One resource set includes at least one CSI-RS resource.

Each CSI-RS resource is identified by a CSI-RS resource ID.

As in Table 2, parameters (e.g., a BM-related "repetition" parameter and a tracking-related "trs-Info" parameter) indicating the use of a CSI-RS for each NZP CSI-RS resource set may be configured.

Table 2 illustrates an example of the NZP CSI-RS resource set IE.

TABLE 2

```
-- ASN1START
-- TAG-NZP-CSI-RS-RESOURCESET-START
NZP-CSI-RS-ResourceSet ::=        SEQUENCE {
    nzp-CSI-ResourceSetId         NZP-CSI-RS-ResourceSetId,
    nzp-CSI-RS-Resources          SEQUENCE         (SIZE
(1..maxNrofNZP-CSI-RS-ResourcesPerSet)) OF NZP-CSI-RS-ResourceId,
    repetition                    ENUMERATED { on, off }
        OPTIONAL,
    aperiodicTriggeringOffset     INTEGER(0..4)
        OPTIONAL,    -- Need S
    trs-Info                      ENUMERATED {true}
        OPTIONAL,    -- Need R
    ...
}
-- TAG-NZP-CSI-RS-RESOURCESET-STOP
-- ASN1STOP
```

In Table 2, the repetition parameter is a parameter indicating whether the same beam is repeatedly transmitted, and indicates whether a repetition is "ON" or "OFF" for each NZP CSI-RS resource set. A transmission (Tx) beam used in the present disclosure may be interpreted as the same meaning as a spatial domain transmission filter. A received (Rx) beam used in the present disclosure may be interpreted as the same meaning as a spatial domain reception filter.

For example, if the repetition parameter in Table 2 is configured as "OFF", a UE does not assume that an NZP CSI-RS resource(s) within a resource set is transmitted as the same Nrofports as the same DL spatial domain transmission filter in all symbols.

Furthermore, the repetition parameter corresponding to a higher layer parameter corresponds to "CSI-RS-ResourceRep" of an L1 parameter.

The CSI report configuration-related information includes a report configuration type (reportConfigType) parameter indicating a time domain behavior and a report quantity (reportQuantity) parameter indicating CSI-related quantity for reporting.

The time domain behavior may be periodic, aperiodic or semi-persistent.

Furthermore, the CSI report configuration-related information may be represented as a CSI-ReportConfig IE. Table 3 below illustrates an example of a CSI-ReportConfig IE.

TABLE 3

```
-- ASN1START
-- TAG-CSI-RESOURCECONFIG-START
CSI-ReportConfig ::=              SEQUENCE {
    reportConfigId                CSI-ReportConfigId,
    carrier
```

TABLE 3-continued

```
ServCellIndex                                  OPTIONAL,  -- Need S
resourcesForChannelMeasurement                 CSI-ResourceConfigId,
csi-IM-ResourcesForInterference                CSI-ResourceConfigId
OPTIONAL,  -- Need R
nzp-CSI-RS-ResourcesForInterference            CSI-ResourceConfigId
OPTIONAL,  -- Need R
reportConfigType                               CHOICE {
    periodic
SEQUENCE {
        reportSlotConfig
CSI-ReportPeriodicityAndOffset,
        pucch-CSI-ResourceList
SEQUENCE (SIZE (1..maxNrofBWPs)) OF PUCCH-CSI-Resource
    },
    semiPersistentOnPUCCH
SEQUENCE {
        reportSlotConfig
CSI-ReportPeriodicityAndOffset,
        pucch-CSI-ResourceList
SEQUENCE (SIZE (1..maxNrofBWPs)) OF PUCCH-CSI-Resource
    },
    semiPersistentOnPUSCH
SEQUENCE {
        reportSlotConfig
    ENUMERATED {sl5, sl10, sl20, sl40, sl80, sl160, sl320},
        reportSlotOffsetList                   SEQUENCE
(SIZE (1.. maxNrofUL-Allocations)) OF INTEGER(0..32),
        p0alpha
    P0-PUSCH-AlphaSetId
    },
    aperiodic
SEQUENCE {
        reportSlotOffsetList                   SEQUENCE
(SIZE (1..maxNrofUL-Allocations)) OF INTEGER(0..32)
    }
},
reportQuantity                                 CHOICE {
    none
NULL,
    cri-RI-PMI-CQI                             NULL,
    cri-RI-i1
NULL,
    cri-RI-i1-CQI
SEQUENCE {
        pdsch-BundleSizeForCSI
    ENUMERATED {n2, n4}                        OPTIONAL
    },
    cri-RI-CQI
NULL,
    cri-RSRP
NULL,
    ssb-Index-RSRP
NULL,
    cri-RI-LI-PMI-CQI                          NULL
},
```

Furthermore, the UE measures CSI based on the configuration information related to CSI (S220). The CSI measurement may include (1) a CSI-RS reception process S221 of the UE and (2) a process S222 of computing CSI through a received CSI-RS.

A sequence for a CSI-RS is generated by Equation 1 below. An initialization value of a pseudo-random sequence C(i) is defined by Equation 2.

$$r(m) = \frac{1}{\sqrt{2}}(1 - 2 \cdot c(2m)) + j\frac{1}{\sqrt{2}}(1 - 2 \cdot c(2m+1))$$ [Equation 1]

$$c_{int} = (2^{10}(N_{symb}^{slot} n_{s,i}^{\mu} + l + 1)(2n_{ID} + 1) + n_{ID}) \bmod 2^{31}$$ [Equation 2]

In Equations 1 and 2, $n_{s,i}^{\mu}$ indicates a slot number within a radio frame, and a pseudo-random sequence generator is initialized as Cint at the start of each OFDM symbol, that is, $n_{s,r}^{\mu}$ Furthermore, l is an OFDM symbol number within a slot. $n_{ID}$ is identical with a higher-layer parameter scramblingID.

Furthermore, in the CSI-RS, resource element (RE) mapping of a CSI-RS resource is configured in time and frequency domains by a higher layer parameter CSI-RS-ResourceMapping.

Table 4 illustrates an example of a CSI-RS-ResourceMapping IE.

TABLE 4

```
-- ASN1START
-- TAG-CSI-RS-RESOURCEMAPPING-START
CSI-RS-ResourceMapping ::=              SEQUENCE {
    frequencyDomainAllocation           CHOICE {
        row1                            BIT
STRING (SIZE (4)),
        row2                            BIT
STRING (SIZE (12)),
        row4                            BIT
STRING (SIZE (3)),
        other                           BIT
STRING (SIZE (6))
    },
    nrofPorts
    ENUMERATED {p1,p2,p4,p8,p12,p16,p24,p32},
    firstOFDMSymbolInTimeDomain         INTEGER (0..13),
    firstOFDMSymbolInTimeDomain2        INTEGER (2..12)
        OPTIONAL,   -- Need R
    cdm-Type
    ENUMERATED {noCDM, fd-CDM2, cdm4-FD2-TD2, cdm8-FD2-TD4},
    density                             CHOICE {
        dot5
    ENUMERATED {evenPRBs, oddPRBs},
        one
NULL,
        three                           NULL,
        spare                           NULL
    },
    freqBand                            CSI-
FrequencyOccupation,
    ...
}
```

In Table 4, density D indicates the density of CSI-RS resources measured in an RE/port/physical resource block (PRB). nrofPorts indicates the number of antenna ports. Furthermore, the UE reports the measured CSI to the base station (S230).

In this case, if the quantity of CSI-ReportConfig is configured as "none (or No report)" in Table 3, the UE may omit the report.

However, although the quantity is configured as "none (or No report)", the UE may report the measured CSI to the base station.

A case where the quantity is configured as "none" is a case where an aperiodic TRS is triggered or a case where a repetition is configured.

In this case, the reporting of the UE may be defined to be omitted only when the repetition is configured as "ON."

In summary, if the repetition is configured as "ON" and "OFF", CSI reporting may include all of "No report", "SSB resource indicator (SSBRI) and L1-RSRP", and "CSI-RS resource indicator (CRT) and L1-RSRP."

Alternatively, if the repetition is "OFF", the CSI reporting of "SSBRI and L1-RSRP" or "CRT and L1-RSRP" may be defined to be transmitted. If the repetition is "ON", the CSI reporting of "No report", "SSBRI and L1-RSRP", or "CRT and L1-RSRP" may be defined to be transmitted.

Beam Management (BM) Procedure

A beam management (BM) procedure defined in new radio (NR) is described.

The BM procedure corresponds to layer 1 (L1)/L2 (layer 2) procedures for obtaining and maintaining a set of base station (e.g., gNB or TRP) and/or a terminal (e.g., UE) beams which may be used for downlink (DL) and uplink (UL) transmission/reception, and may include the following procedure and terms.

Beam measurement: an operation of measuring characteristics of a beamforming signal received by a base station or a UE.

Beam determination: an operation of selecting, by a base station or a UE, its own transmission (Tx) beam/received (Rx) beam.

Beam sweeping: an operation of covering a space region by using a Tx and/or Rx beam for a given time interval in a predetermined manner.

Beam report: an operation of reporting, by a UE, information of a beamformed signal based on beam measurement.

FIG. 3 is a concept view illustrating an example of a beam-related measurement model.

For beam measurement, an SS block (or SS/PBCH block (SSB)) or a channel state information reference signal (CSI-RS) is used in the downlink. A sounding reference signal (SRS) is used in the uplink.

In RRC_CONNECTED, a UE measures multiple beams (or at least one beam) of a cell. The UE may average measurement results (RSRP, RSRQ, SINR, etc.) in order to derive cell quality.

Accordingly, the UE may be configured to consider a sub-set of a detected beam(s).

Beam measurement-related filtering occurs in different two levels (in a physical layer that derives beam quality and an RRC level in which cell quality is derived from multiple beams).

Cell quality from beam measurement is derived in the same manner with respect to a serving cell(s) and a non-serving cell)(s).

If a UE is configured by a gNB to report measurement results for a specific beam(s), a measurement report includes measurement results for X best beams. The beam measurement results may be reported as L1-reference signal received power (RSRP).

In FIG. 3, K beams (gNB beam 1, gNB beam 2, . . . , gNB beam k) 210 are configured for L3 mobility by a gNB, and correspond to the measurement of a synchronization signal (SS) block (SSB) or CSI-RS resource detected by a UE in the L1.

In FIG. 3, layer 1 filtering 220 means internal layer 1 filtering of an input measured at a point A.

Furthermore, in beam consolidation/selection 230, beam-specific measurements are integrated (or merged) in order to derive cell quality.

Layer 3 filtering 240 for cell quality means filtering performed on measurement provided at a point B.

A UE evaluates a reporting criterion whenever new measurement results are reported at least at points C and C1.

D corresponds to measurement report information (message) transmitted at a radio interface.

In L3 beam filtering 250, filtering is performed on measurement (beam-specific measurement) provided at a point A1.

In beam selection 260 for a beam report, X measurement values are selected in measurement provided at a point E.

F indicates beam measurement information included in a measurement report (transmission) in a radio interface.

Furthermore, the BM procedure may be divided into (1) a DL BM procedure using a synchronization signal (SS)/physical broadcast channel (PBCH) Block or CSI-RS and (2) an UL BM procedure using a sounding reference signal (SRS).

Furthermore, each of the BM procedures may include Tx beam sweeping for determining a Tx beam and Rx beam sweeping for determining an Rx beam.

DL BM Procedure

First, the DL BM procedure is described.

The DL BM procedure may include (1) the transmission of beamformed DL reference signals (RSs) (e.g., CSI-RS or SS block (SSB)) of a base station and (2) beam reporting of a UE.

In this case, the beam reporting may include a preferred DL RS identifier (ID)(s) and L1-reference signal received power (RSRP) corresponding thereto.

The DL RS ID may be an SSB resource indicator (SSBRI) or a CSI-RS resource indicator (CRI).

FIG. 4 is a diagram illustrating an example of a DL BM procedure-related Tx beam.

As illustrated in FIG. 4, an SSB beam and a CSI-RS beam may be used for beam measurement.

In this case, a measurement metric is L1-RSRP for each resource/block.

An SSB may be used for coarse beam measurement, and a CSI-RS may be used for fine beam measurement.

Furthermore, the SSB may be used for both Tx beam sweeping and Rx beam sweeping.

A UE may perform the Rx beam sweeping using an SSB while changing an Rx beam with respect to the same SSBRI across multiple SSB bursts.

In this case, one SS burst includes one or more SSBs, and one SS burst set includes one or more SSB bursts.

DL BM Procedure Using SSB

FIG. 5 is a flowchart illustrating an example of a DL BM procedure using an SSB.

A configuration for a beam report using an SSB is performed upon CSI/beam configuration in an RRC connected state (or RRC connected mode).

As in a CSI-ResourceConfig IE of Table 8, a BM configuration using an SSB is not separately defined, and an SSB is configured like a CSI-RS resource.

Table 5 illustrates an example of the CSI-ResourceConfig IE.

TABLE 5

```
-- ASN1START
-- TAG-CSI-RESOURCECONFIG-START
CSI-ResourceConfig ::=                    SEQUENCE {
    csi-ResourceConfigId                  CSI-ResourceConfigId,
    csi-RS-ResourceSetList                CHOICE {
        nzp-CSI-RS-SSB
    SEQUENCE {
            nzp-CSI-RS-ResourcesetList            SEQUENCE
(SIZE (1..maxNrofNZP-CSI-RS-ResourceSetsPerConfig)) OF NZP-CSI-RS-
ResourceSetId OPTIONAL,
            csi-SSB-ResourceSetList
        SEQUENCE (SIZE (1..maxNrofCSI-SSB-ResourceSetsPerConfig)) OF CSI-SSB-
ResourceSetId OPTIONAL
        },
        csi-IM-ResourceSetList                    SEQUENCE   (SIZE
(1..maxNrofCSI-IM-ResourceSetsPerConfig)) OF CSI-IM-ResourceSetId
    },
    bwp-Id                                BWP-Id,
    resourceType                          ENUMERATED
{ aperiodic, semiPersistent, periodic },
    ...
}
-- TAG-CSI-RESOURCECONFIGTOADDMOD-STOP
-- ASN1STOP
```

In Table 5, the csi-SSB-ResourceSetList parameter indicates a list of SSB resources used for beam management and reporting in one resource set. A UE receives, from a base station, a CSI-ResourceConfig IE including CSI-SSB-ResourceSetList including SSB resources used for BM (S510).

In this case, the SSB resource set may be configured with {SSBx1, SSBx2, SSBx3, SSBx4, . . . }.

An SSB index may be defined from 0 to 63.

Furthermore, the UE receives an SSB resource from the base station based on the CSI-SSB-ResourceSetList (S520).

Furthermore, if CSI-RS reportConfig related to a report for an SSBRI and L1-RSRP has been configured, the UE (beam) reports, to the base station, the best SSBRI and L1-RSRP corresponding thereto (S530).

That is, if reportQuantity of the CSI-RS reportConfig IE is configured as "ssb-Index-RSRP", the UE reports the best SSBRI and the L1-RSRP corresponding thereto to the base station.

Furthermore, if a CSI-RS resource is configured in an OFDM symbol(s) identical with an SS/PBCH block (SSB) and "QCL-TypeD" is applicable, the UE may assume that a CSI-RS and an SSB are quasi co-located from a "QCL-TypeD" viewpoint.

In this case, the QCL TypeD may mean that antenna ports have been QCLed from a spatial Rx parameter viewpoint. When the UE receives a plurality of DL antenna ports having a QCL Type D relation, the same Rx beam may be applied.

Furthermore, the UE does not expect that a CSI-RS will be configured in an RE that overlaps an RE of an SSB.

DL BM Procedure Using CSI-RS

If a UE is configured with NZP-CSI-RS-ResourceSet having a (higher layer parameter) repetition configured as "ON", the UE may assume that at least one CSI-RS resource within the NZP-CSI-RS-ResourceSet is transmitted as the same downlink spatial domain transmission filter.

That is, at least one CSI-RS resource within the NZP-CSI-RS-ResourceSet is transmitted through the same Tx beam.

In this case, the at least one CSI-RS resource within the NZP-CSI-RS-ResourceSet may be transmitted in different OFDM symbols or may be transmitted in different frequency domains (i.e., through FDM).

A case where the at least one CSI-RS resource is FDMed is a case where a UE is a multi-panel UE.

Furthermore, a case where a repetition is configured as "ON" is related to an Rx beam sweeping procedure of a UE.

The UE does not expect that different periodicities will be received in periodicityAndOffset in all CSI-RS resources within NZP-CSI-RS-Resourceset.

Furthermore, if the repetition is configured as "OFF", the UE does not assume that at least one CSI-RS resource within NZP-CSI-RS-ResourceSet is transmitted as the same downlink spatial domain transmission filter.

That is, the at least one CSI-RS resource within NZP-CSI-RS-ResourceSet is transmitted through different Tx beams.

A case where the repetition is configured as "OFF" is related to a Tx beam sweeping procedure of a base station.

Furthermore, the repetition parameter may be configured only with respect to CSI-RS resource sets associated with CSI-ReportConfig having the reporting of L1 RSRP or "No Report (or None)."

If a UE is configured with CSI-ReportConfig having reportQuantity configured as "cri-RSRP" or "none" and CSI-ResourceConfig (higher layer parameter resources-ForChannelMeasurement) for channel measurement does not include a higher layer parameter "trs-Info" and includes NZP-CSI-RS-ResourceSet configured (repetition=ON) as a higher layer parameter "repetition", the UE may be configured with only the same number of ports (1-port or 2-port) having a higher layer parameter "nrofPorts" with respect to all CSI-RS resources within the NZP-CSI-RS-ResourceSet.

More specifically, CSI-RS uses are described. If a repetition parameter is configured in a specific CSI-RS resource set and TRS_info is not configured, a CSI-RS is used for beam management.

Furthermore, if a repetition parameter is not configured and TRS_info is configured, a CSI-RS is used for a tracking reference signal (TRS).

Furthermore, if a repetition parameter is not configured and TRS_info is not configured, a CSI-RS is used for CSI acquisition.

FIG. 6 is a diagram illustrating an example of a DL BM procedure using a CSI-RS.

(a) of FIG. 6 illustrates an Rx beam determination (or refinement) procedure of a UE. (b) of FIG. 6 indicates a Tx beam determination procedure of a base station.

Furthermore, (a) of FIG. 6 corresponds to a case where the repetition parameter is configured as "ON", and (b) of FIG. 6 corresponds to a case where the repetition parameter is configured as "OFF."

An Rx beam determination process of a UE is described with reference to (a) of FIG. 6 and FIG. 7.

FIG. 7 is a flowchart illustrating an example of a received beam determination process of a UE.

The UE receives, from a base station, an NZP CSI-RS resource set IE including a higher layer parameter repetition through RRC signaling (S710).

In this case, the repetition parameter is configured as "ON."

Furthermore, the UE repeatedly receives a resource(s) within a CSI-RS resource set configured as a repetition "ON" in different OFDM symbols through the same Tx beam (or DL spatial domain transmission filter) of the base station (S720).

Accordingly, the UE determines its own Rx beam (S730).

In this case, the UE omits a CSI report or transmits, to the base station, a CSI report including a CRI/L1-RSRP (S740).

In this case, reportQuantity of the CSI report config may be configured as "No report (or None)" or "CRT+L1-RSRP."

That is, if a repetition "ON" is configured, the UE may omit a CSI report. Alternatively, the UE may report ID information (CRT) for a beam pair-related preference beam and a corresponding quality value (L1-RSRP).

A Tx beam determination process of a base station is described with reference to (b) of FIG. 6 and FIG. 8.

FIG. 8 is a flowchart illustrating an example of a method of determining, by a base station, a transmission beam.

A UE receives, from a base station, an NZP CSI-RS resource set IE including a higher layer parameter repetition through RRC signaling (S810).

In this case, the repetition parameter is configured as "OFF", and is related to a Tx beam sweeping procedure of the base station.

Furthermore, the UE receives resources within the CSI-RS resource set configured as the repetition "OFF" through different Tx beams (DL spatial domain transmission filters) of the base station (S820).

Furthermore, the UE selects (or determines) the best beam (S830), and reports an ID for the selected beam and related quality information (e.g., L1-RSRP) to the base station (S840).

In this case, reportQuantity of the CSI report config may be configured as "CRT+L1-RSRP."

That is, the UE reports a CRT and corresponding L1-RSRP to the base station if a CSI-RS is transmitted for BM.

FIG. 9 is a diagram illustrating an example of resource allocation in time and frequency domains related to the operation of FIG. 6.

That is, it may be seen that if the repetition "ON" has been configured in a CSI-RS resource set, a plurality of CSI-RS resources is repeatedly used by applying the same Tx beam, and if a repetition "OFF" has been configured in the CSI-RS resource set, different CSI-RS resources are transmitted through different Tx beams.

DL BM-Related Beam Indication

A UE may be RRC-configured with a list of a maximum of M candidate transmission configuration indication (TCI) states for an object of at least quasi co-location (QCL) indication. In this case, M may be 64.

Each of the TCI states may be configured as one RS set.

Each ID of a DL RS for at least a spatial QCL purpose (QCL Type D) within the RS set may refer to one of DL RS types, such as an SSB, a P-CSI RS, an SP-CSI RS, and an A-CSI RS.

The initialization/update of an ID of a DL RS(s) within the RS set used for the at least spatial QCL purpose may be performed through at least explicit signaling.

Table 6 illustrates an example of a TCI-State IE.

The TCI-State IE associates one or two DL reference signals (RS) with a corresponding quasi co-location (QCL) type.

TABLE 6

```
-- ASN1START
-- TAG-TCI-STATE-START
TCI-State ::=            SEQUENCE {
    tci-StateId              TCI-StateId,
    qcl-Type1                QCL-Info,
    qcl-Type2                QCL-Info
        OPTIONAL,   -- Need R
    ...
}
QCL-Info ::=             SEQUENCE {
    cell                     ServCellIndex
        OPTIONAL,   -- Need R
    bwp-Id                   BWP-Id
        OPTIONAL, -- Cond CSI-RS-Indicated
    referenceSignal          CHOICE {
        csi-rs                   NZP-
CSI-RS-ResourceId,
        ssb
        SSB-Index
    },
    qcl-Type
    ENUMERATED {typeA, typeB, typeC, typeD},
    ...
}
-- TAG-TCI-STATE-STOP
-- ASN1STOP
```

In Table 6, the bwp-Id parameter indicates a DL BWP where an RS is located. The cell parameter indicates a carrier where an RS is located. The reference signal parameter indicates a reference antenna port(s) that becomes the source of a quasi co-location for a corresponding target antenna port(s) or a reference signal including the reference antenna port(s). A target antenna port(s) may be a CSI-RS, a PDCCH DMRS, or a PDSCH DMRS. For example, in order to indicate QCL reference RS information for an NZP CSI-RS, a corresponding TCI state ID may be indicated in NZP CSI-RS resource configuration information. Furthermore, for example, in order to indicate QCL reference information for a PDCCH DMRS antenna port(s), a TCI state ID may be indicated in a CORESET configuration. Furthermore, for example, in order to indicate QCL reference information for a PDSCH DMRS antenna port(s), a TCI state ID may be indicated through DCI.

Quasi-Co Location (QCL)

An antenna port is defined so that a channel on which a symbol on an antenna port is carried is inferred from a channel on which another symbol on the same antenna port is carried. If the properties of a channel on which a symbol on one antenna port is carried can be derived from a channel on which a symbol on another antenna port is carried, the two antenna ports may be said to have a quasi co-located or quasi co-location (QC/QCL) relation.

In this case, the properties of the channel includes one or more of delay spread, Doppler spread, a frequency shift, average received power, received timing, and a spatial RX parameter. In this case, the spatial Rx parameter means a spatial (reception) channel property parameter, such as an angle of arrival.

In order to decode a PDSCH according to a detected PDCCH having intended DCI with respect to a corresponding UE and a given serving cell, a UE may be configured with a list of up to M TCI-State configurations within higher layer parameter PDSCH-Config. The M depends on a UE capability.

Each of the TCI-States includes a parameter for configuring a quasi co-location relation between one or two DL reference signals and the DM-RS port of a PDSCH.

The quasi co-location relation is configured as a higher layer parameter qcl-Type1 for a first DL RS and a higher layer parameter qcl-Type2 (if configured) for a second DL RS.

In the case of the two DL RSs, QCL types are not the same regardless of whether reference is the same DL RS or different DL RSs.

A quasi co-location type corresponding to each DL RS is given by a higher layer parameter qcl-Type of QCL-Info, and may take one of the following values:
 "QCL-TypeA": {Doppler shift, Doppler spread, average delay, delay spread}
 "QCL-TypeB": {Doppler shift, Doppler spread}
 "QCL-TypeC": {Doppler shift, average delay}
 "QCL-TypeD": {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and with a specific SSB from a QCL-Type D viewpoint. A UE configured with such an indication/configuration may receive a corresponding NZP CSI-RS by using Doppler, delay value measured in a QCL-TypeA TRS, and may apply, to the reception of the corresponding NZP CSI-RS, an Rx beam used for the reception of a QCL-TypeD SSB.

The UE receives an activation command used to map up to eight TCI states to the codepoint of a DCI field "Transmission Configuration Indication."

Beam Failure Detection (BFD) and Beam Failure Recovery (BFR) Procedure

A beam failure detection and beam failure recovery procedure is described below.

In a beamformed system, a radio link failure (RLF) may frequently occur due to the rotation, movement or beam blockage of a UE.

Accordingly, in order to prevent a frequent RLF from occurring, BFR is supported in NR.

BFR is similar to a radio link failure recovery procedure, and may be supported if a UE is aware of a new candidate beam(s).

For convenience of understanding, (1) a radio link monitoring procedure and (2) a link recovery procedure are first described in brief Radio Link Monitoring Downlink radio link quality of a primary cell is monitored by a UE for the purpose of indicating an out-of-sync or in-sync state for higher layers.

A cell used in the present disclosure may also be represented as a component carrier, a carrier, a BW, etc.

A UE does not need to monitor downlink radio link quality in a DL BWP other than an active DL BWP on a primary cell.

The UE may be configured with respect to each DL BWP of SpCell having a set of resource indices through a corresponding set of (higher layer parameter) RadioLinkMonitoringRS for radio link monitoring by a higher layer parameter failureDetectionResources.

A higher layer parameter RadioLinkMonitoringRS having a CSI-RS resource configuration index (csi-RS-Index) or an SS/PBCH block index (ssb-Index) is provided to the UE.

If RadioLinkMonitoringRS is not provided to a UE and the UE is provided with a TCI-state for a PDCCH including one or more RSs including one or more of a CSI-RS and/or an SS/PBCH block, if an active TCI-state for the PDCCH includes only one RS, the UE uses, for radio link monitoring, an RS provided for the active TCI-state for the PDCCH.

If the active TCI-state for the PDCCH includes two RSs, the UE expects that one RS has QCL-TypeD and will use one RS for radio link monitoring. In this case, the UE does not expect that both the RSs will have QCL-TypeD.

The UE does not use an aperiodic RS for radio link monitoring.

Table 7 below illustrates an example of an RadioLinkMonitoringConfig IE.

The RadioLinkMonitoringConfig IE is used to configure radio link monitoring for the detection of a beam failure and/or a cell radio link failure.

TABLE 7

```
-- ASN1START
-- TAG-RADIOLINKMONITORINGCONFIG-START
RadioLinkMonitoringConfig ::=            SEQUENCE {
    failureDetectionResourcesToAddModList        SEQUENCE
(SIZE(1..maxNrofFailureDetectionResources)) OF RadioLinkMonitoringRS
        OPTIONAL,   -- Need N
    failureDetectionResourcesToReleaseList SEQUENCE
(SIZE(1..maxNrofFailureDetectionResources)) OF RadioLinkMonitoringRS-Id
        OPTIONAL,-- Need N
    beamFailureInstanceMaxCount                  ENUMERATED {n1,
n2, n3, n4, n5, n6, n8, n10}
        OPTIONAL,   -- Need S
    beamFailureDetectionTimer                    ENUMERATED
{pbfd1, pbfd2, pbfd3, pbfd4, pbfd5, pbfd6, pbfd8, pbfd10}
        OPTIONAL,   -- Need R
    ...
}
RadioLinkMonitoringRS ::=                SEQUENCE {
    radioLinkMonitoringRS-Id
    RadioLinkMonitoringRS-Id,
    purpose
    ENUMERATED {beamFailure, rlf, both},
    detectionResource                            CHOICE {
        ssb-Index                                    SSB-Index,
        csi-RS-Index                                 NZP-CSI-RS-ResourceId
    },
    ...
}
-- TAG-RADIOLINKMONITORINGCONFIG-STOP
-- ASN1STOP
```

In Table 7, the beamFailureDetectionTimer parameter is a timer for beam failure detection. The beamFailureInstanceMaxCount parameter indicates that a UE triggers beam failure recovery after how many beam failure events.

The value n1 corresponds to one beam failure instance, and the value n2 corresponds to two beam failure instances. If a network reconfigures a corresponding field, a UE resets a counter related to on-goingbeamFailureDetectionTimer and beamFailureInstanceMaxCount.

If a corresponding field is not present, the UE does not trigger beam failure recovery.

Table 8 illustrates an example of an BeamFailureRecoveryConfig IE.

The BeamFailureRecoveryConfig IE is used to configure, in a UE, RACH resources and candidate beams for beam failure recovery in a beam failure detection situation.

TABLE 8

```
-- ASN1START
-- TAG-BEAM-FAILURE-RECOVERY-CONFIG-START
BeamFailureRecoveryConfig ::=            SEQUENCE {
    rootSequenceIndex-BFR                        INTEGER (0..137)
        OPTIONAL,   -- Need M
```

TABLE 8-continued

```
    rach-ConfigBFR                              RACH-
ConfigGeneric
            OPTIONAL,   -- Need M
    rsrp-ThresholdSSB                           RSRP-Range
            OPTIONAL,   -- Need M
    candidateBeamRSList                         SEQUENCE
(SIZE(1..maxNrofCandidateBeams)) OF PRACH-ResourceDedicatedBFR
    OPTIONAL,   -- Need M
    ssb-perRACH-Occasion                        ENUMERATED    {oneEighth.
oneFourth, oneHalf, one, two, four, eight, sixteen}    OPTIONAL,  -- Need M
    ra-ssb-OccasionMaskIndex                    INTEGER (0..15)
            OPTIONAL,   -- Need M
    recoverySearchSpaceId                       SearchSpaceId
            OPTIONAL,   -- Cond CF-BFR
    ra-Prioritization                           RA-Prioritization
            OPTIONAL,   -- Need R
    beamFailureRecoveryTimer                    ENUMERATED {ms10, ms20,
ms40, ms60, ms80, ms100, ms150, ms200}          OPTIONAL,   -- Need
M
    ...
}
PRACH-ResourceDedicatedBFR ::=                  CHOICE {
    ssb                                              BFR-
SSB-Resource,
    csi-RS                                           BFR-CSIRS-
Resource
}
BFR-SSB-Resource ::=                            SEQUENCE {
    ssb                                             SSB-Index,
    ra-PreambleIndex                                INTEGER (0..63),
    ...
}
BFR-CSIRS-Resource ::=                          SEQUENCE {
    csi-RS                                          NZP-CSI-RS-
ResourceId,
    ra-OccasionList                                 SEQUENCE (SIZE(1..maxRA-
OccasionsPerCSIRS)) OF INTEGER (0..maxRA-Occasions-1)  OPTIONAL,   -- Need
R
    ra-PreambleIndex                                INTEGER (0..63)
            OPTIONAL,   -- Need R
    ...
}
-- TAG-BEAM-FAILURE-RECOVERY-CONFIG-STOP
-- ASN1STOP
```

In Table 8, the beamFailureRecoveryTimer parameter is a parameter indicating a timer for beam failure recovery, and a value thereof may be set as ms. The candidateBeamRSList parameter indicates a list of reference signals (CSI-RSs and/or SSBs) for identifying random access (RA) parameters associated with candidate beams for recovery.

The RecoverySearchSpaceId parameter indicates a search space used for a BFR random access response (RAR).

When radio link quality is poorer than a threshold value Qout for all resources within a set of resources for radio link monitoring, the physical layer of a UE indicates out-of-sync through a higher layer in frames in which radio link quality is evaluated.

When radio link quality for a given resource within a resource set for radio link monitoring is better than a threshold value Qin, the physical layer of the UE indicates in-sync through a higher layer in a frame in which radio link quality is evaluated.

Link Recovery Procedure

With respect to a serving cell, a UE is provided with a q0 set of periodic CSI-RS resource configuration indices by a higher layer parameter failureDetectionResources and a q1 set of periodic CSI-RS resource configuration indices and/or SS/PBCH block indices by candidateBeamRSList for radio link quality measurement on a serving cell.

If a UE is not provided with failureDetectionResources, the UE determines the q0 set to include an SS/PBCH block index and a periodic CSI-RS resource configuration index having the same value as an RS index within an RS set indicated by a TCI state for each control resource set used for its own PDCCH monitoring.

A threshold value Qout_LR corresponds to a default value of a higher layer parameter rlmInSyncOutOfSyncThreshold and a value provided by a higher layer parameter rsrp-ThresholdSSB.

The physical layer of the UE evaluates radio link quality based on the q0 set of a resource configuration for the threshold Qout_LR.

With respect to the set q0, the UE evaluates radio link quality based on only periodic CSI-RS resource configuration and SSBs quasi co-located with the DM RS reception of a PDCCH, which is monitored by the UE.

The UE applies a Qin_LR threshold value to an L1-RSRP measurement value obtained from an SS/PBCH block.

After scaling each CSI-RS received power into a value provided by powerControlOffsetSS, the UE applies the Qin_LR threshold value to the L1-RSRP measurement value obtained with respect to the CSI-RS resource.

The physical layer of the UE provides indication to a higher layer when radio link quality of all corresponding resource configurations within a set used for the UE to evaluate the radio link quality is poorer than the threshold value Qout_LR.

The physical layer provides notification to a higher layer when the radio link quality is poorer than the threshold Qout_LR having periodicity determined as a maximum value between the shortest periodicity of an SS/PBCH block and 2 msec in a periodic CSI-RS configuration or in the q0 set used for the UE to evaluate the radio link quality.

In response to a request from a higher layer, the UE provides the higher layer with a periodic CSI-RS configuration index and/or SS/PBCH block index from the q1 set and a corresponding L1-RSRP measurement value equal to or identical with a corresponding threshold value.

A UE may be provided with a control resource set through a link with a search space set provided by recoverySearchSpaceId in order to monitor a PDCCH in the control resource set.

If the UE is provided with recoverySearchSpaceId, the UE does not expect that another search space will be provided in order to monitor a PDCCH in a control resource set associated with a search space provided by recoverySearchSpaceId.

The aforementioned beam failure detection (BFD) and beam failure recovery (BFR) procedure is subsequently described.

When a beam failure is detected on a serving SSB or a CSI-RS(s), a beam failure recovery procedure used to indicate a new SSB or CSI-RS for a serving base station may be configured by RRC.

RRC configures BeamFailureRecoveryConfig for a beam failure detection and recovery procedure.

FIG. 10 is a flowchart illustrating an example of a beam failure recovery procedure.

The BFR procedure may include (1) a beam failure detection step S1010, (2) a new beam identification step S1020, (3) a beam failure recovery request (BFRQ) step S1030 and (4) the step S1040 of monitoring a response to BFRQ from a base station.

In this case, a PRACH preamble or a PUCCH may be used for the step (3), that is, for BFRQ transmission.

The step (1), that is, the beam failure detection, is more specifically is described.

When the block error rates (BLERs) of all serving beams are a threshold or more, this is called a beam failure instance.

RSs(qo) to be monitored by a UE is explicitly configured by RRC or is implicitly determined by a beam RS for a control channel.

The indication of a beam failure instance is periodic through a higher layer, and an indication interval is determined by the lowest periodicity of beam failure detection (BFD) RS s.

If evaluation is lower than a beam failure instance BLER threshold, an indication through a higher layer is not performed.

If N consecutive beam failure instances occur, a beam failure is declared.

In this case, N is a NrofBeamFailureInstance parameter configured by RRC.

1-port CSI-RS and SSB is supported for a BFD RS set.

Next, the step (2), that is, new beam indication is described.

A network NW may configure one or multiple PRACH resources/sequences for a UE.

A PRACH sequence is mapped to at least one new candidate beam.

The UE selects a new beam among candidate beams each having L1-RSRP set to be equal to or higher than a threshold set by RRC, and transmits a PRACH through the selected beam. In this case, which beam is selected by the UE may be a UE implementation issue.

Next, the steps (3) and (4), that is, BFRQ transmission and the monitoring of a response to BFRQ are is described.

A UE may be configured with a dedicated CORESET by RRC in order to monitor time duration of a window and a response to BFRQ from a base station.

The UE starts monitoring after 4 slots of PRACH transmission.

The UE assumes that the dedicated CORESET has been spatially QCLed with the DL RS of a UE-identified candidate beam in a beam failure recovery request.

If a timer expires or the number of PRACH transmissions reaches a maximum number, the UE stops the BFR procedure.

In this case, a maximum number and timer of PRACH transmissions is configured by RRC.

Slot aggregation in NR

In Rel-15 new ratio (NR), a method of increasing reliability by repetitively transmitting one transport block (TB) to one layer in a plurality of contiguous slots has been standardized as described in a predefined rule (e.g., 3GPP TS 38.214, 5.1.2.1., 6.1.2.1.) with respect to the transmission of a physical downlink shared channel (PDSCH) and a physical uplink shared channel (PUSCH), that is, physical channels capable of transmitting data and control information. In this case, each of aggregationFactorDL and aggregationFactorUL may have one value of {2,4,8} (refer to 3GPP TS 38.331). That is, the same data may be repeatedly transmitted in contiguous 2 slots, 4 slots, or 8 slots.

If a UE is configured with aggregationFactorDL>1, the same symbol allocation may also be applied to aggregationFactorDL contiguous slots. The UE may expect that a TB is repeated within each symbol allocation within the AggregationFactorDL contiguous slots and a PDSCH will be limited to a single transmission layer. A redundancy version to be applied to an n-th transmission occasion of the TB may be determined according to Table 9.

Table 9 illustrates a redundancy version applied when aggregationFactorDL>1.

TABLE 9

| $rv_{id}$ indicated by DCI that schedules a PDSCH | $rv_{id}$ applied to an $n^{th}$ transmission occasion | | | |
| --- | --- | --- | --- | --- |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

When the UE is configured with aggregationFactorUL>1, the same symbol allocation may be applied throughout aggregationFactorUL consecutive slots, and the PUSCH may be limited to a single transmission layer. The UE may have to repeat the TB throughout aggregationFactorUL consecutive slots by applying the same symbol allocation in each slot. A redundancy version to be applied to an nth transmission occasion of the TB may be determined according to Table 10.

Table 10 illustrates a redundancy version when aggregationFactorUL>1.

TABLE 10

| $rv_{id}$ indicated by DCI that schedules a PUSCH | $rv_{id}$ applied to an $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Furthermore, in NR, the same uplink control information (UCI) may be repeatedly transmitted in a plurality of contiguous slots (in which available UL resource is present) with respect to a physical uplink control channel (PUCCH), that is, a channel in which uplink control information is transmitted, as described in a predefined rule (e.g., 3GPP TS 38.213, 9.2.6.).

As described above, if a multi-slot PUSCH in which repetitive transmissions for a TB are performed and/or a multi-slot PUCCH in which repetitive transmissions for UCI are performed is configured and/or indicated, when a collision occurs between a PUSCH and/or PUCCH resource and another PUCCH resource and/or PUSCH resource (transmission is indicated in the same symbol and/or slot) during repetitive transmissions in contiguous slots in which an available uplink (UL) resource is present, an operation of not transmitting the TB and/or the UCI in a corresponding slot or piggybacking (or multiplexing) and transmitting the TB and/or the UCI in a resource in which a collision has occurred, etc. is defined.

Cell/Base Station Diversity Improvement

In a resource of ultra-reliable, low latency communications (URLLC) service, to secure reliability in relation to a radio channel state is a challenging issue. In general, a requirement for a radio section of reliability are defined so that the probability that a packet of y bytes needs to be transmitted within x msec is z % or more (e.g., x=1, y=100, z=99.999). In order to satisfy such a requirement, the most difficult point is that the capability of a corresponding channel does not fundamentally satisfy the condition because the quality of a radio channel itself is too deteriorated.

In the present disclosure, a cell/base station diversity is obtained to solve the above-described problem. That is, the same data is transmitted to multiple cells/base stations/RPs, and as a result, even though a radio channel for a specific cell/base station/RP significantly deteriorates, the UE may send information to another cell/base station/RP having a relatively excellent channel state to satisfy a reliability requirement. Hereinafter, embodiments for obtaining the cell/base station diversity will be described in an order of cell cycling uplink transmission, cross cell scheduling, UE demodulation, downlink control signaling for indicating a sequence of the RPs, symbol muting for cell cycling, and uplink synchronization.

Cell Cycling Uplink Transmission

In uplink transmission, the UE performs data transmission alternatively to a plurality of cells/base stations/RPs in a promised order, that is, performs cell cycling uplink transmission. In the consecutive transmission, uplink scheduling information (uplink grant) has a feature of being signaled to the UE only once.

When this technique is applied, various methods may be considered in configuring a signal to be transmitted for each cell/base station/RP.

As an example, a method for repeatedly transmitting the same signal to each cell/base station/RP may be considered. That is, a method for repeatedly transmitting a signal to which the same channel coding is applied from the same information bit to each cell/base station/RP may be considered.

As another example, a method may be considered, which performs coding at a lower coding ratio in proportion to the number of participating cells/base stations/RPs from one information bit and then separately transmits coded bits to each cell/base station/RP.

When such methods are summarized, the methods may be classified into extended channel coding and separated channel coding.

1) Extended Channel Coding

The extended channel coding is a technique that applies channel coding so as to transmit different parity bits of an encoded codeword to different cells/base stations/RPs and decode the transmitted parity bits in one decoder. The extended channel coding may be classified as follows according to whether the information bit is repeated.

Information bit repetition channel coding: According to this technique, the information bits in transport blocks (TBs) to be transmitted to different cells/base stations/RPs are configured to be the same as each other and the parity bits are configured to be different from each other. A parity bit to be used in encoding is designated in advance to prevent the parity bits of different cells/base stations/RPs from being redundant. This is similar to a case where the TB to be transmitted to each cell/base station/RP is considered as retransmission of IR-HARQ.

As an example, when the number of cells/base stations/RPs is N, the parity bits generated in encoding may be divided into N groups and each cell/base station/RP may be configured to use only the parity bit in the group. An apparatus that receives the corresponding signal may know parity group information transmitted to each cell/base station/RP, and the parity bits in the TB received in each cell/base station/RP may be sorted for each group and decoded.

Information bit non-repetition channel coding: According to this technique, TBs are bound to be form one group TB in different cells/base stations/RPs, and the channel coding is performed according to a group TB size. The corresponding technique has an advantage that a channel coding gain is the largest and a disadvantage that decoding is possible only when all TBs of each cell/base station/RP should be received.

2) Separated Channel Coding

The separated channel coding technique may be classified into a log likelihood ratio (LLR) combining technique and a hard value combining technique.

Repetition based LLR combining: According to this technique, TBs having the same size are repeatedly transmitted to different cells/base stations/RPs. An apparatus that receives the corresponding signal obtains an LLR value by independently performing a process before decoding. Thereafter, the apparatus may add calculated LLR values and utilize the added LLR values as an input value of one decoder.

Hard value combining: According to this technique, the TBs having the same size are applied to different cells/base stations/RPs and the same TB is repeatedly transmitted, and TBs received by different cells/base stations/RPs are independently decoded. When even one of the TBs of each cell/base station/RP is successfully decoded, it is determined that reception of a signal is successful.

Cross Cell Scheduling

The network schedules scheduling information for a plurality of consecutive subframes in a first subframe only once, and the UE transmits the information to the plurality of cells/base stations/RPs in uplink transmission in the plurality of consecutive subframes.

Information regarding whether uplink scheduling for the plurality of consecutive subframes is performed may be provided to the UE through a higher layer signaling such as an MAC layer message or an RRC layer message or transferred to the UE together with the uplink scheduling information.

According to an embodiment, when the UE may know that URLLC information is to be transmitted in advance, transmission of the information regarding whether the scheduling is performed may be omitted.

According to an embodiment, when the UE requests scheduling to the base station, the information regarding whether the scheduling is performed may be transmitted together with uplink scheduling request information.

In applying the embodiment, the UE may define an action (e.g., blind decoding) for finding a UL grant not to be performed during subsequent consecutive N subframes after receiving the UL grant in a specific subframe.

Hereinafter, an operation related to the cross cell scheduling will be described in detail with reference to FIGS. 11 and 12.

FIGS. 11 and 12 illustrate examples of scheduling for cell cycling uplink transmission according to an embodiment of the present disclosure.

FIG. 11 illustrates an example in which a resource scheduled in the first subframe is continued during a plurality of consecutive subframes and FIG. 12 illustrates an example in which the resource scheduled in the first subframe is hopped according to a predetermined rule during the plurality of consecutive subframes. When the resource is hopped, there may be an advantage that a frequency diversity gain may be further obtained in a situation in which channel quality measurement for multiple cells is not sufficiently performed. When supporting both a case where the resource is hopped and a case where the resource is not hopped, a signaling for whether the resource is hopped may be indicated to the UE as physical layer or higher layer information. In this example, a TDD system is assumed, but even in the case of an FDD system, a downlink control channel and an uplink data channel may be allocated to different frequency bands and similarly applied.

In FIGS. 11 and 12, a basic unit that switches the uplink transmission to the cells/base stations/RPs is assumed as the subframe, but a scope of the present disclosure is not limited to the corresponding example. That is, the uplink transmission may be switched in units of a plurality of symbol groups.

FIG. 13 illustrates an example of performing the cell cycling uplink transmission in units of a symbol group according to an embodiment of the present disclosure. FIG. 13 illustrates an example of binding a 3-symbol unit and alternatively transmitting the bound symbols to the plurality of RPs.

Hereinafter, for convenience of description, a unit time of alternatively performing transmission to the cell/base station/RP, for example, the subframe in FIGS. 11 and 12 and the 3 symbol unit in FIG. 13 will be referred to as a time unit (TU).

Referring to FIG. 13, at least one uplink (UL) demodulation reference signal per TU is transmitted. The reason is that the cell/base station/RP that is to receive the UL demodulation reference signal is different for each TU.

Hereinafter, an operation related to a downlink control signaling for indicating a sequence of the RPs will be described.

The network signals, to the UE, at least one information of (a) and (b) below for a plurality of cells/base stations/RPs that are to participate in receiving uplink data.

(a) Cell/base station/RP ID information to be received in each TU (b) Physical resource position and/or sequence information of the reference signal in the cell/base station/RP ID to be received in each TU Since the reference signal transmitted to each TU is received by different cells/RPs, physical resource positions (time/frequencies) and/or sequences corresponding to different cells/RP IDs may be used. Therefore, the information should be signaled in order for the UE to transmit the reference signals. As an example, the participating cell/RP ID may be directly transmitted as in (a). Alternatively, a scrambling ID of the reference signal may be transmitted as in (b), and in this case, the network may inform the UE of scrambling ID set information of the reference signals consecutively transmitted through the physical layer or higher layer message.

In particular, since a previously defined cell/RP ID and the scrambling ID for the reference signal may be used for a cell/RP giving the uplink grant in a first TU, only information on subsequent reference signals may be signaled except for information on the first TU.

Hereinafter, muting will be described in relation to a timing advance for cell cycling.

The UE that transmits consecutive TUs may apply different timing advance (TA) values for each TU. In this case, it is preferable that the symbol is muted at a TU boundary point. The reason is that when the UE transmits the signals to base stations which exist physically at different distances, uplink time synchronization may be different for each TU.

As an example, when the UE transmits N consecutive TUs, the UE may mute a last symbol of a $1^{st}$ TU to an (N−1)th TU or a first symbol of a $2^{nd}$ TU to an Nth TU and then apply an independent TA value for each TU.

As another example, the symbol muting may be performed only if the difference in the TA value satisfies a specific condition. For example, muting may be performed only if the TA value of a subsequent TU is larger than the TA value of a previous TU.

The muting operation may be variously interpreted as transmission omission for a specific physical signal or channel, or a puncturing operation or a rate matching operation for resource elements (REs) corresponding to a corresponding symbol corresponding to the specific physical channel.

FIG. 14 illustrates an example of a muting operation during the cell cycling uplink transmission according to an embodiment of the present disclosure.

FIG. 14 illustrates a case where since the TA value in a second TU is larger than the TA value in a first TU, the first symbol in the second TU may not be transmitted. Referring to FIG. 14, the first symbol in the second TU is muted. If the TA value in the second TU is smaller than the TA value in the first TU, muting need not be performed.

Hereinafter, an operation related to uplink synchronization will be described.

Method 1—The network previously provides a base station/cell/RP list which has a possibility to perform consecutive transmission to the UE through the higher layer signaling. The UE that receives the corresponding message transmits a specific uplink signal (e.g., PRACH or uplink reference signal) to each base station/cell/RP to receive set values (TA values) for matching uplink time synchronization in advance. Such an operation is to prepare for a case where the UE is to perform consecutive uplink transmission to the base stations/cells/RPs included in the list.

Method 2—A plurality of base stations/cells/RPs may receive the specific uplink signal (e.g., PRACH or uplink reference signal) of the UE and then signal, to the UE, the set values (TA values) for matching each uplink time synchronization.

According to Method 1, after the UE accesses a specific base station/cell/RP, the UE transmits an uplink signal for acquiring uplink synchronization setting values for additional base stations/cells/RPs in the corresponding base station/cell/RP. The UE may receive the uplink synchronization setting value through such an operation.

According to Method 2, when the UE transmits the specific uplink signal, a plurality of base stations/cells/RPs that are to cyclically receive data receive the corresponding signal together. As a result, a plurality of uplink synchronization setting values are signaled separately or through a representative base station/cell (e.g., serving cell).

In the present disclosure, uplink transmission to different base stations/cells/RPs which are physically separated is assumed and described, but this does not limit the scope of the present disclosure. When base stations implement at the physically same position operate multiple frequency bands (carriers), each frequency band is operated as an independent logical cell to extensively apply the embodiments according to the present disclosure.

Further, the methods according to the present disclosure may be extended to a technology that cyclically performs transmission in a promised order in different carriers and similarly, also extended to different carriers of different base stations/cells/RPs, in order to obtain the frequency diversity gain. Further, the methods according to the present disclosure may also be applied to a case of performing the uplink transmission by different (reception) beams or different panels according to a predetermined time unit.

Hereinafter, a method for indicating/mapping a spatial relation to a UE transmission beam in a TU (group) unit will be described based on the above-described embodiments.

In the present disclosure, '/' means 'and' or 'or' according to a context. In the present disclosure, the method is described based on the PUSCH, but this does not limit the scope of the present disclosure. That is, the same/similar method may also be applied to the PUCCH comprised of a plurality of time units (TUs).

Further, hereinafter, in the proposed method, a case where the PUSCH is transmitted in consecutive slots through downlink control information, but the scope of the embodiment according to the present disclosure is not limited thereto.

That is, the methods according to the present disclosure may also be applied to 1) a case of transmitting the PUSCH in consecutive slots every specific period (e.g., semi-persistent PUSCH), 2) a case of (semi-statically) granting a UL resource which may be subjected to PUSCH transmission (for the purpose of URLLC or a voice service) and then transmitting the PUSCH in the corresponding resource when the UE requires the PUSCH (e.g., grant-free PUSCH), and a case of transmitting the corresponding PUSCH in the plurality of consecutive slots in the case of 1) or 2) above.

The 'consecutive slots' may be consecutive slots which satisfy a specific condition. For example, in Time Division Duplex (TDD), consecutive slots may be counted in a state where a downlink slot and a flexible slot in which the number of uplink symbols is equal to or less than a specific value are excepted.

According to the above-described proposed contents, one data packet (e.g., transport block, code block group) constituted in a specific unit is repeatedly transmitted throughout multiple time units (TUs), and each TU or TU group is transmitted so that a reception source (e.g., reception point (RP), beam, panel) is different. As a result, the reception source varies for each TU (group) as well as a time diversity and combining diversity by repeated transmission, so the TA value of the UE may vary for each TU (group).

Hereinafter, a method for indicating/mapping the spatial relation (see the CSI related procedure) for a UE transmission beam in units of the TU (group) when the UE beamforms a transmission signal will be proposed. Here, each transmission beam may received by different base stations/TRPs/panels/beams. However, the corresponding operation is not limited thereto, and according to base station implementation, each transmission beam may be simultaneously received by a plurality of base stations/TRPs/panels/beams or a plurality of UE transmission beams may also be received as one wide reception beam.

In particular, the present disclosure proposes a method or a rule for mapping a plurality of spatial relation RSs and TUs according to the total number N of (consecutively) allocated TUs and the total number M of spatial relation RSs.

For convenience of description, hereinafter, in the present disclosure, the TU will be assumed as the slot (or slot group). However, the present disclosure is not limited thereto, and the methods according to the present disclosure may also be applied to a case of constituting the TU at a symbol (group) level. That is, the time unit (TU) may be defined in units of the symbol or slot.

In a current NR standard, a spatial relation RS for the SRS or PUSCH is configured to indicate one of an SRS Resource Indicator (SRI), a CRS-RS Resource Indicator (CRI), and SS/PBCH Resource Indicator (SSBRI), and a spatial relation RS for the PUSCH is configured to indicate an SRI(s) (for codebook or non-codebook based UL transmission).

Here, in Rel-15, in the case of codebook based UL, one SRI may be indicated in DCI format 0-1 and in the case of non-codebook based UL, SRI(s) may be indicated as large as the number of transmission layers in DCI format 0-1.

In the following description, the term spatial relation RS will be used instead of the SRI so as to be applied to the PUCCH in addition to the PUSCH, and for convenience, a main example will be described based on the codebook based UL.

In the case of the non-codebook based UL transmission, 'one SRI' may be changed to 'SRIs as large as the number of layers' in the following proposed methods.

Further, the term spatial relation RS as RS information for an uplink beam indication may be expressed while being replaced with another term such as downlink transmission configuration indicator (TCI) used for a beam indication in downlink or an uplink TCI, an uplink QCL RS, or a TCI (integrated between downlink and uplink) as a term corresponding to QCL RS information.

When applying the embodiment according to the present disclosure, representative information exchange between the base station and the UE, and representative operations of the base station and the UE are described below.

Step 1 (Base Station→UE)

1) The base station may configure/indicate a TU group configuration for the multi-TU PUSCH and spatial relation RS(s) information (i.e., transmission beam information) to be applied for each TU group to the UE. The time unit (TU) may be the symbol or slot.

The information may be comprised of multiple detailed information, and each detailed information may be transferred to the UE through different messages stepwise. For example, whether the multi-TUs are configured and TU grouping information may be transferred through the RRC message and the spatial relation RS(s) information may be transferred through a multiple access control (MAC) control element (CE) or downlink control information (DCI).

2) The base station may trigger transmission of the multi-TU PUSCH through the downlink control information (DCI). As another example, the base station may activate the transmission of the multi-TU PUSCH through the downlink control information (DCI) or the Multiple Access Control (MAC) Control Element (CE).

In this case, the base station may transmit (some of) spatial relation RS(s) information to be applied for each slot group together.

An operation related to the triggering/activation may be omitted in a case where the embodiment according to the present disclosure is applied to a multi-TU PUCCH or a grant-free PUSCH.

Step 2 (UE→Base Station)

1) The UE may receive a TU group configuration for the multi-TU PUSCH and spatial relation RS(s) information (i.e., transmission beam information) to be applied for each TU group.

The information may be comprised of multiple detailed information, and each detailed information may be received through different messages stepwise. For example, whether the multi-TUs are configured and the TU grouping information may be transferred through the RRC message and the spatial relation RS(s) information may be transferred through the MAC CE or DCI.

2) The UE may receive a message for triggering or activating the transmission of the multi-TU PUSCH. The message may be the downlink control information (DCI) or the multiple access control (MAC) control element (CE).

In this case, the UE may receive (some of) spatial relation RS(s) information to be applied for each TU group together.

A receiving operation related to the triggering/activation may be omitted in a case where the embodiment according to the present disclosure is applied to the multi-TU PUCCH or the grant-free PUSCH.

3) The UE may determine a PUSCH transmission beam (spatial domain filter) to be applied to the corresponding TU group from the spatial relation RSs indicated/configured for each TU group of the multi-TU PUSCH. The UE may transmit the PUSCH in the corresponding TU group by using the determined PUSCH transmission beam (spatial domain filter).

The UE may operate as follows in relation to the determination of the PUSCH transmission beam (spatial domain filter) to be applied to the corresponding TU group from the spatial relation RSs.

When the spatial relation RS is an uplink reference signal (UL RS) (e.g., SRS), the UE may configure the PUSCH transmission beam with a beam that transmits the corresponding uplink reference signal.

When the spatial relation RS is a downlink reference signal (DL RS) (e.g., CSI-RS, SRS), the UE may configure the PUSCH transmission beam with a transmission beam corresponding to the corresponding downlink reference signal reception beam.

The configuration of the 'transmission beam corresponding to the reception beam' may vary according to UE implementation. As an example, the UE may constitute the same spatial domain filter as the reception beam with the transmission beam. As another example, the UE may arbitrarily perform a correspondence relationship between the transmission beam and the reception beam and then use an (optimal) transmission beam corresponding to an (optimal) reception beam for the corresponding downlink reference signal (DL RS).

Step 3 (Base Station)

The base station may operate as follows in order to receive the multi-TU PUSCH.

The base station may receive the PUSCH (and DMRS) by using the TRP/panel/beam that receives the spatial relation RS(s) configured/indicated for each TU group that constitutes the multi-TU PUSCH. As another example, the base station may receive the PUSCH (and DMRS) by using the TRP/panel/beam that is determined to be suitable for reception of the corresponding Spatial Relation RS(s).

Each TU group that constitutes the multi-TU PUSCH may be simultaneously received by the plurality of TRPs/panels/beams.

The receiving operation of the multi-TU PUSCH may vary according to the base station implementation, and a standardized operation may not be defined.

The UE (repeatedly) transmits a signal (containing the same information) through different transmission beams for each TU group (or TU) as described above to increase a communication success probability even when a link quality between a specific transmission beam and the base station deteriorates due to blockage of a ray and/or beam, UE rotation, UE mobility, etc. The reason is that the link quality with another TRP, panel, and/or beam may be relatively excellent even when a quality of a specific link deteriorates.

Hereinafter, an operation of the base station that indicates the spatial relation RS(s) which the UE is to apply for each TU group constituting the multi-TU PUSCH will be described. Methods to be described below are just distinguished for convenience and it is needless to say that some components of any one method may be substituted with some components of another method or may be applied in combination with each other.

Embodiment 1

A method may be considered in which the base station configuring/indicating the multi-TU PUSCH to the UE separately indicates the spatial relation RS(s) which the UE is to apply for each TU group.

The multi-TU PUSCH may be a PUSCH transmitted in N time units (TUs).

The base station that configures/indicates the multi-TU PUSCH to the UE divides N TUs into K TU groups to separately indicate the spatial relation RS(s) which the UE is to apply for each TU group.

In Embodiment 1 above, even in the case of codebook based UL transmission, the base station may indicate a plurality of spatial relation RSs for each TU group according to a UE capability.

For example, if the UE may be mounted with a plurality of transmission panels, and may transmit one (or one or more) beam per each panel or the UE is capable of simultaneously transmitting a plurality of beams in a single panel, the UE may apply two or more transmission beams for each TU group.

Specifically, when the base station indicates, to the corresponding UE, spatial relation RSs={SRI #0, SRI #1} to be applied in TU Group #0 and spatial relation RSs={SRI #2, SRI #3} to be applied in TU Group #1, the UE may use both a beam used when transmitting SRI #0 and a beam used when transmitting SRI #1 in TU group #0 and use both a beam used when transmitting SRI #2 and a beam used when transmitting SRI #3 in TU group #1.

According to an embodiment, each of the spatial relation RSs indicated for each TU group may be applied to a specific layer group or applied to all layers.

A specific example of transmission of a layer group unit will be described below.

As an example, it is assumed that transmission in which a rank value is set to 4 for spatial relation RSs={SRI #0, SRI #1} to be applied in TU group #0 as in the above-described example is indicated. If layer group information is indicated like 1st layer group={1st layer and 2nd layer} and 2nd layer group={3rd layer and 4th layer}, the UE uses a beam used when transmitting SRI #0 for transmission of the 1st layer group of the corresponding TU group and a beam used when transmitting SRI #1 for transmission of the 2nd layer group of the corresponding TU group.

As another example, the transmission may also be applied to the same layer group. This corresponds to a case of simultaneously transmitting the same signal by a plurality of beams. That is, if rank=4 is indicated like the above example, the UE transmits all layers (4 layers) by a beam used when transmitting SRI #0 (through a specific panel/antenna group/RF chain) and transmits all layers (4 layers) used when transmitting SRI #1 (through another panel/antenna group/RF chain).

The base station may configure, to the UE, which mode of two transmission modes (layer group unit transmission and all layer redundancy transmission) is to be applied.

In codebook (CB) based UL transmission, a single or a plurality of spatial relation RS(s) may be indicated for one TU group, and in this case, each spatial relation RS indicator (e.g., SRI) may be indicated together with a separate Transmitted Precoding Matrix Indicator (TPMI) and a separate Transmit Rank Indicator (TRI).

That is, the UE configures an (analog) beam with spatial relation RS information indicated when transmitting the PUSCH in the corresponding TU group and constitutes a precoding matrix for transmitting the corresponding PUSCH with TPMI and TRI information mapped with the corresponding spatial relation RS.

When a plurality of spatial relation RS information is indicated to the same TU group for the codebook based uplink transmission, the Transmitted Precoding Matrix Indicator (TPMI) and the Transmit Rank Indicator (TRI) are indicated to each spatial relation RS (e.g., the TPMI and the TRI are indicated for each panel).

As another example, the TPMI may be separately indicated for each spatial relation RS and the TRI may be indicated as one common value. Specifically, when the indicated TRI is 2, two layers may be repeatedly transmitted to each panel every time and one layer may be transmitted in each panel of a UE having two panels every time. In this case, the TRI value may be configured to use a defined value (e.g., TRI=1, i.e., one layer per each panel.

As yet another example, one (master) TPMI/TRI may be indicated for the plurality of spatial relation RSs. Specifically, when each of 4 port SRI #0 and 4 port SRI #1 is indicated as the spatial relation RS in a specific TU group (for the CB based UL transmission), one TPMI/TRI may be indicated based on 8 Tx by adding ports of two SRS resources. Here, the TPMI is a matrix index selected in an 8 port codebook. Multi-TU transmission may be fixed to TRI=1 for the purpose of the URLLC. In this case, only the TPMI(s) is indicated and in this case, the TPMI is an index selected in a rank 1 codebook.

In the case of non-CB based UL, SRIs may be indicated as large as the total number of layers to be transmitted for each TU group. Here, since some of the SRIs may be transmitted in the same (analog) beam and the remaining SRIs may be transmitted in different (analog) beams, spatial relation RSs of SRIs constituting the indicated SRIs may be different from each other.

For example, when four SRIs are indicated for rank 4 transmission, the spatial relation of two SRIs may be CRI #0 and the spatial relation of the remaining two SRIs may be CRI #1. The UE may transmit first two SRIs with the same (analog) beam and different digital beams. The UE may transmit the remaining two SRIs with the same (analog) beam and different digital beams. The different digital beams may be differently precoded beams. As a result, first two layers and remaining two layers of the PUSCH transmitted in the corresponding TU group may be transmitted with different beams.

As another method, the base station may indicate/configure to simultaneously transmit the same layer(s) with a plurality of beams (according to the UE capability). This means, in particular, indicating the plurality of spatial relation RSs (e.g., SRIs) for the same layer(s) (or UL DMRS port(s)).

That is, unlike indicating 1-port SRIs which are as many as transmission ranks in the legacy non-codebook based transmission, the base station may 1) indicate X-port SRIs which are as many as transmission ranks or 2) indicate SRIs which are as large as a value acquired by multiplying the transmission rank by X. Here, X corresponds to the number of spatial relations or the number of beams to perform simultaneous transmission.

When the X is the number of spatial relations to perform the simultaneous transmission, a plurality of ports included in one SRS resource are reference signals which may be simultaneously transmitted with different beams (through different panels/antenna groups/RF chains), respectively. As an example, the base station may indicate eight SRIs to the UE for rank 4 transmission, and in this case, the UE maps two SRIs to each layer (according to a specific rule or a base station configuration) and then simultaneously transmits the layer with the beams for transmitting two SRIs mapped at the time of transmitting each layer (through different panels/antenna groups/RF chains).

SRS resources which (are transmitted in different panels) may be simultaneously transmitted and SRS resources which (are transmitted in the same panel) may not be simultaneously transmitted may be separately configured at the time of configuring the SRS. As an example, it may be impossible to simultaneously transmit SRS resources in the same SRS resource set and it may be possible to simultaneously transmit SRS resources which belong to different SRS resource sets.

In other words, all of the SRS resources which belong to the SRS resource set may be physically transmitted in all same transmission panels (with different beams or the same beam), and when the number of SRS resource sets is set to X, the UE may generate beams in X transmission panels, respectively and transmit the generated beams in the corresponding SRS resources, respectively. In this case, it is more preferable that when the plurality of SRIs are indicated for each TU group, there is a feature that SRIs indicated in the same TU group belong to different SRS resource sets, respectively. In this case, SRIs indicated in different TU groups may be included in the same SRS resource set (because the SRIs are transmitted at different times).

As in Embodiment 1 above, in order for the UE to be configured to transmit the beam for transmission of the multi-TU PUSCH while changing the corresponding beam in units of the TU group, spatial relation RS information which should be indicated by the base station increases. Hereinafter, methods for more efficiently indicating the spatial relation RS information will be described. In other words, methods for minimizing a payload size (e.g., DCI payload size) of control information indicating the spatial relation RS information will be described in detail.

Embodiment 1-1

A method for indicating spatial relation RS set information to be applied to K TU groups as one spatial relation state may be considered.

Specifically, the base station may configure, to the UE, a plurality of spatial relation states through the higher layer message (e.g., RRC message) and then indicate one of the plurality of spatial relation states through a lower layer message (e.g., DCI or MAC-CE).

The lower layer message may be downlink control information to trigger the transmission of the multi-TU PUSCH. Alternatively, the lower layer message may be downlink control information (DCI) or a Multiple Access Control (MAC) Control Element (CE) for activating semi-persistent transmission of the multi-TU PUSCH.

In this case, a size of a field indicating the spatial relation state in the downlink control information (DCI) may be determined by the number of spatial relation states configured by the higher layer message. For example, the size of the field may be a minimum value among n (natural number) values according to 2^n which is equal to or larger than the total number of configured states. In this case, the n value may mean the number of bits of the field.

Examples of the specific operation according to Embodiment 1-1 above are described below.

1) When the number of TU groups, K is 4, the base station may operate as follows.

The base station may configure two states through RRC like spatial relation state #0={SRI #0, SRI #1, SRI #2, SRI #3} and spatial relation state #1={SRI #0, SRI #1, SRI #0, SRI #1} and then indicate one of two states with 1-bit downlink control information (DCI). Here, a k-th element means a spatial relation RS to be applied to a k-th TU group. That is, k=1, 2, 3, 4. The base station may configure or indicate the same spatial relation RS to multiple TU groups.

2) When the UE is capable of simultaneously transmitting two beams while the number of TU groups, K is 2, the base station may operate as follows.

The base station may configure two states through RRC like spatial relation state #0={SRI #0, SRI #1, SRI #2, SRI #3} and spatial relation state #1={SRI #0, SRI #1, SRI #0, SRI #1} and then indicate one of two states with 1-bit downlink control information (DCI). Here, 1st & 2nd elements mean two spatial relation RSs to be applied to a first TU group and 3rd & 4th elements mean two spatial relation RSs to be applied to a second TU group.

3) When the UE is capable of simultaneously transmitting X (=2) beams while the number of TU groups, K is 2, and two SRS resources (transmitted with different beams in the same panel) which may not be simultaneously transmitted are configured in one SRS resource set, the base station may operate as follows. It is assumed that SRS resource set #0={SRI #0, SRI #1} and SRS resource set #1={SRI #2, SRI #3}, and resources in a set may not be simultaneously transmitted and SRS resources which belong to different sets may be simultaneously transmitted (are transmitted in different panels).

In this case, the base station may configure four spatial relation states through the RRC as follows.

spatial relation state #0={1st SRI in the SRS resource set #0, 2nd SRI in the SRS resource set #1}, spatial relation state #1={2nd SRI in the SRS resource set #0, 1st SRI in the SRS resource set #1}, spatial relation state #2={1st SRI in the SRS resource set #1, 1st SRI in the SRS resource set #0}, spatial relation state #3={2nd SRI in the SRS resource set #1, 2nd SRI in the SRS resource set #0}

The base station may indicate X (=2) states for each TU group with 4-bit downlink control information. The bit is a value according to X (=2)×2.

Here, a k-th element means a spatial relation RS to be applied to a k-th TU group. That is, k=1, 2.

When the base station indicates 1st spatial relation state=#0 and 2nd spatial relation state=#3 as the downlink control information (DCI), the UE may operate as follows.

The spatial relation state for a first TU group is {1st SRI in SRS resource set #0, 2nd SRI in SRS resource set #1}. In other words, the spatial relation state for the first TU group is {SRI #0, SRI #3}.

The UE may constitute a PUSCH beam to transmit the 1st TU group by using two beams for transmitting SRI #0 (transmitted in a first panel) and SRI #3 (transmitted in a second panel).

The spatial relation state for a second TU group is {1st SRI in SRS resource set #1, 2nd SRI in SRS resource set #0}. In other words, the spatial relation state for the second TU group is {SRI #1, SRI #3}.

The UE may constitute a PUSCH beam to be transmitted in the 2nd TU group by using two beams for transmitting SRI #1 (transmitted in the first panel) and SRI #3 (transmitted in the second panel).

Hereinafter, a method for performing more efficient signaling by accessing in a different direction from Embodiment 1-1 will be described.

Embodiment 1-2

The spatial relation RS(s) information to be applied to each TU group may be separately indicated/configured. Hereinafter, this will be described in detail in Methods 1 to 3.

Method 1) The base station may previously configure spatial relation RS(s) for all TU groups through the higher layer message (e.g., RRC and/or MAC-CE). The base station may omit the indication of the spatial relation RS(s) or indicate a random (or promised) spatial relation RS (e.g., SRI) in a message (e.g., DCI) for triggering/activating scheduling of the multi-TU PUSCH. The random (or promised) spatial relation RS may be irrelevant to a spatial relation RS(s) which the UE is to actually apply.

Method 2) The base station may previously configure/indicate remaining (K−D) spatial relation RS set(s) other than D spatial relation RS set(s) to be applied to a specific TU group(s) among K spatial relation RS sets through the higher layer message. The base station may indicate the spatial relation RS set(s) to be applied to the specific TU group(s) through the downlink control information (DCI) for scheduling the multi-TU PUSCH (e.g., D=1).

The 'spatial relation RS set' means a set of one or a plurality of spatial relation RSs applied to single TU PUSCH transmission. For example, in the codebook based PUSCH, in a single-panel UE, the spatial relation RS set may be one single SRI for CB based UL PUSCH (with single panel)) and when the rank value is R in the non-codebook based PUSCH, the spatial relation RS set may be R SRIs (R SRIs for non-CB based UL PUSCH where R=transmit rank for PUSCH).

A default spatial relation value may be promised/defined for more efficient signaling. Specifically, in a case where the indication of the spatial relation RS set is omitted or a specific promised spatial relation RS set value is indicated in the downlink control information for scheduling the multi-TU PUSCH (scheduling DCI) for scheduling the multi-TU PUSCH (e.g., SRI=0) or in a case where downlink format 0-0 (DCI format 0-0) is used, the default spatial relation values used in the above cases may be promised/defined.

An example of the default spatial relation is described below.

Same spatial relation as the PUCCH with lowest ID and same spatial domain filter used for transmitting most recent preamble random access channel (PRACH).

An example of the specific TU group is described below. The specific TU group may be configured as an initially transmitted TU group among a plurality of TU groups constituting the corresponding PUSCH or a TU group corresponding to a lowest TU group index.

Method 3) The base station may indicate K all spatial relation RS set(s) through the downlink control information for scheduling the multi-TU PUSCH (scheduling DCI).

In the above method, some of K spatial relation RS set(s) may configure/define some of K spatial relation RS set(s) to apply the default spatial relation proposed in Method 2 in order to reduce downlink control information (DCI) overhead. In this case, only remaining spatial relation RS set(s) other than the TU group(s) to which the default spatial relation is to be applied among K spatial relation RS set(s) may be indicated through the downlink control information (DCI).

In the above method, in order to reduce the downlink control information (DCI) overhead, the base station may configure a (compact) spatial relation RS list to be used in the case of the multi-TU PUSCH through the higher layer signaling. A payload size of the downlink control information (DCI) for indicating the spatial relation of each TU group may be configured/defined according to the size of the list.

The spatial relation RS list for the multi-TU PUSCH may be configured as a subset of a spatial relation RS list for a single TU PUSCH.

For example, a total of four SRS resources may be configured for the purpose of the codebook based UL, but the list may be configured to include only two SRS resources among four SRS resources. In the case of the single TU PUSCH, the base station designates one SRI among four resources with 2-bit information. In the case of the multi-TU PUSCH, the base station may designate one SRI of two with the 1-bit information for each TU group.

Similarly, even in the case of the non-codebook (CB) based UL, a payload of the downlink control information may be reduced through a method for separately designating the SRS resource list which becomes a candidate in the case of the multi-TU PUSCH.

In application of the method, a spatial relation RS list to be used may be separately configured according to the number K of TU groups indicated with the downlink control information (DCI) or the total number N of TUs constituting the PUSCH.

For example, a list may be configured, which is comprised of a smaller number of spatial relation RSs in order to maximally reduce the DCI payload by reducing the number of candidate spatial relation RSs for each TU group as K is larger (e.g., in the case of K=1, 8 SRIs (3 bits), in the case of K=2, 4 SRIs (2 bits), and in the case of K=3, 2 SRIs (1 bit)).

Methods 1 to 3 described above may be used in combination with each other together with the K value or the N value. For example, it may be defined that if K or N is equal to or less than a specific value, Method 3 is used and if K or N is more than the specific value, Method 1 or 2 is used.

When Embodiment 1 above is applied, the following signal/operation flow is exemplarily enabled in the base station.

Step 1 (Base Station→UE)

1) The base station may configure/indicate a TU group configuration for the multi-TU PUSCH and spatial relation RS(s) (i.e., transmission beam information) to be applied for each TU group to the UE. The time unit (TU) may be defined in units of the symbol or slot.

The information may be comprised of multiple detailed information, and each detailed information may be transferred to the UE through different messages stepwise. For example, whether the multi-TUs are configured and TU grouping information may be transferred through the RRC message and the spatial relation RS(s) information may be transferred through a multiple access control (MAC) control element (CE) or downlink control information (DCI).

2) The base station may trigger transmission of the multi-TU PUSCH through the downlink control information (DCI). As another example, the base station may activate the transmission of the multi-TU PUSCH through the downlink control information (DCI) or the Multiple Access Control (MAC) Control Element (CE).

In this case, the base station may transmit (some of) spatial relation RS(s) information to be applied for each slot group together.

An operation related to the triggering/activation may be omitted in a case where the embodiment according to the present disclosure is applied to a multi-TU PUCCH or a grant-free PUSCH.

The UE (repeatedly) transmits a signal (containing the same information) through different transmission beams for each TU group (or TU) as described above to increase a communication success probability even when a link quality between a specific transmission beam and the base station deteriorates due to blockage of a ray and/or beam, UE rotation, UE mobility, etc. The reason is that the link quality with another TRP, panel, and/or beam may be relatively excellent even when a quality of a specific link deteriorates.

Hereinafter, an operation of the corresponding UE in which the base station that indicates the spatial relation RS(s) which the UE is to apply for each TU group constituting the multi-TU PUSCH will be described. Embodiment 2 below is related to each method in Embodiment 1 described above and the operation of the UE corresponding to the embodiment. Methods to be described below are just distinguished for convenience and it is needless to say that some components of any one method may be substituted with some components of another method or may be applied in combination with each other.

Embodiment 2

The UE that is configured/indicated with the multi-TU PUSCH from the base station may apply the configured/indicated spatial relation RS(s) for each TU group.

The multi-TU PUSCH may be a PUSCH transmitted in N time units (TUs). The UE divides N time units (TUs) into K TU groups to apply the configured/indicated spatial relation RS(s) for each TU group.

In Embodiment 2 above, in the case of the codebook based UL transmission, the UE may be indicated with the plurality of spatial relation RSs for each TU group according to the UE capability.

For example, if the UE may mount a plurality of transmission panels, and may transmit one (or one or more) beam per each panel or the UE is capable of simultaneously transmitting a plurality of beams in a single panel, the UE may be indicated to apply two or more transmission beams for each TU group.

In the case of the non-CB based UL, the UE may be indicated with SRIs as large as the total number of layers to be transmitted for each TU group. Here, since some of the indicated SRIs may be transmitted in the same (analog) beam and the remaining SRIs may be transmitted in different (analog) beams, spatial relation RSs of SRIs constituting the indicated SRIs may be different from each other.

When the UE is configured/indicated with the SRS, the UE may determine whether to transmit the SRS resource in the same transmission antenna group/panel according to whether the SRS is an SRS resource which belongs to the same SRS resource set. As an example, all of the SRS resources which belong to the SRS resource set are physically transmitted in all same transmission panels (with different beams or the same beam), and when the number of SRS resource sets is set to X, the UE may generate beams in X transmission panels, respectively and transmit the SRS resources. In this case, it is more preferable that when the plurality of SRIs are indicated for each TU group, there is a feature that SRIs indicated in the same TU group belong to different SRS resource sets, respectively. In this case, SRIs indicated in different TU groups may be included in the same SRS resource set (because the SRIs are transmitted at different times).

In that as in Embodiment 1 above, in order for the UE to be configured to transmit the beam for transmission of the multi-TU PUSCH while changing the corresponding beam in units of the TU group, spatial relation RS information which should be indicated by the base station increases, the same methods as in Embodiments 1-1 and 1-2 are proposed. Hereinafter, each of the operations of the UE that receives the signaling of the base station according to Embodiments 1-1 and 1-2 above will be described.

Embodiment 2-1

The UE may be configured with a plurality of spatial relation states through the higher layer message (e.g., RRC) and then indicated with one of the plurality of spatial relation states through a lower layer message (e.g., DCI or MAC-CE).

The UE that is allocated with multi-TU PUSCH transmission resources (and indicated with transmission) may divide multiple TUs into K TU groups. The UE may determine/apply a spatial relation RS set to be applied to each of K TU groups according to information designated in a finally indicated spatial relation state. The UE may transmit the multi-TU PUSCH by determining a beam (spatial domain filter) to be transmitted in each TU group as described above.

The lower layer message may be downlink control information to trigger the transmission of the multi-TU PUSCH. Alternatively, the lower layer message may be downlink control information (DCI) or a Multiple Access Control (MAC) Control Element (CE) for activating semi-persistent transmission of the multi-TU PUSCH.

In this case, a size of a field indicating the spatial relation state in the downlink control information (DCI) may be determined by the number of spatial relation states configured by the higher layer message. For example, the size of the field may be a minimum value among n (natural number) values according to $2^n$ which is equal to or larger than the total number of configured states. In this case, the n value may mean the number of bits of the field.

Examples of the specific operation according to Embodiment 2-1 above are described below.

1) When the number of TU groups, K is 4, the UE may operate as follows.

The UE may be configured with two states, i.e., spatial relation state #0={SRI #0, SRI #1, SRI #2, SRI #3} and spatial relation state #1={SRI #0, SRI #1, SRI #0, SRI #1} from the base station through the RRC. The UE may be indicated with one state of two states with 1-bit downlink control information (DCI). Here, a k-th element means a spatial relation RS to be applied to a k-th TU group. That is, k=1, 2, 3, 4. The UE may be configured/indicated with the same spatial relation RS in multiple TU groups.

2) When the UE is capable of simultaneously transmitting two beams while the number of TU groups, K is 2, the UE may operate as follows.

The UE may be configured with two states, i.e., spatial relation state #0={SRI #0, SRI #1, SRI #2, SRI #3} and spatial relation state #1={SRI #0, SRI #1, SRI #0, SRI #1} from the base station through the RRC. The corresponding UE may be indicated with one state of two states with the 1-bit downlink control information (DCI). Here, 1st & 2nd elements mean two spatial relation RSs to be applied to a first TU group and 3rd & 4th elements mean two spatial relation RSs to be applied to a second TU group.

3) When the UE is capable of simultaneously transmitting X (=2) beams while the number of TU groups, K is 2, and two SRS resources (transmitted with different beams in the same panel) which may not be simultaneously transmitted are configured in one SRS resource set, the UE may operate as follows.

It is assumed that the UE transmits SRI #0 and SRI #1 with the same beam or different beams in the same antenna group/panel/RF chain and similarly transmits SRI #2 and SRI #3 with the same beam or different beams in the same antenna group/panel/RF chain. That is, (SRI #0 or SRI #1) and (SRI #2 or SRI #3) are transmitted in different or the same antenna group/panel/RF chain.

In this case, the UE may be configured with four spatial relation states from the base station through the RRC as follows.

spatial relation state #0={$1^{st}$ SRI in the SRS resource set #0, $2^{nd}$ SRI in the SRS resource set #1}, spatial relation state #1={$2^{nd}$ SRI in the SRS resource set #0, $1^{st}$ SRI in the SRS resource set #1}, spatial relation state #2={$1^{st}$ SRI in the SRS resource set #1, $1^{st}$ SRI in the SRS resource set #0}, spatial relation state #3={$2^{nd}$ SRI in the SRS resource set #1, $2^{nd}$ SRI in the SRS resource set #0}, The UE may be indicated with X (=2) states for each TU group with 4-bit downlink control information. The bit is a value according to X (=2)×2.

Here, a k-th element means a spatial relation RS to be applied to a k-th TU group. That is, k=1, 2.

The spatial relation state for the first TU group is {1st SRI in SRS resource set #0, 2nd SRI in SRS resource set #1}. In other words, the spatial relation state for the first TU group is {SRI #0, SRI #3}.

The UE may constitute a PUSCH beam to transmit the 1st TU group by using two beams for transmitting SRI #0 (transmitted in a first panel) and SRI #3 (transmitted in a second panel).

The spatial relation state for a second TU group is {1st SRI in SRS resource set #1, 2nd SRI in SRS resource set #0}. In other words, the spatial relation state for the second TU group is {SRI #1, SRI #3}.

The UE may constitute a PUSCH beam to transmit the 2nd TU group by using two beams for transmitting SRI #1 (transmitted in the first panel) and SRI #3 (transmitted in the second panel).

Embodiment 2-2

The method in which the UE is separately indicated/configured with the spatial relation RS(s) information to be applied to each TU group will be hereinafter described in detail in Methods 1 to 3.

Method 1) The UE may be previously configured with spatial relation RS(s) for all TU groups through the higher layer message (e.g., RRC and/or MAC-CE). The UE may expect that the indication of the spatial relation RS(s) is omitted in a message (e.g., DCI) for triggering/activating scheduling of the multi-TU PUSCH or ignore the spatial relation RS(s) (e.g., SRI) indicated by the message. That is, the UE ignores an SRI value indicated by the downlink control information (DCI) and applies a preconfigured spatial relation RS(s) through the higher layer message.

Method 2) The UE may be previously configured/indicated with remaining (K−D) spatial relation RS set(s) other than D spatial relation RS set(s) to be applied to a specific TU group(s) among K spatial relation RS sets through the higher layer message. The corresponding UE may be indicated with the spatial relation RS set(s) to be applied to the specific TU group(s) through the downlink control information (DCI) for scheduling the multi-TU PUSCH (e.g., D=1).

The 'spatial relation RS set' means a set of one or a plurality of spatial relation RSs applied to single TU PUSCH transmission. For example, in the codebook based PUSCH, in a single-panel UE, the spatial relation RS set may be one single SRI for CB based UL PUSCH (with single panel)) and when the rank value is R in the non-codebook based PUSCH, the spatial relation RS set may be R SRIs (R SRIs for non-CB based UL PUSCH where R=transmit rank for PUSCH).

A default spatial relation value may be promised/defined for more efficient signaling. Specifically, when the indication of the spatial relation RS set is omitted in the downlink control information for scheduling the multi-TU PUSCH (scheduling DCI) for scheduling the multi-TU PUSCH or a specific promised spatial relation RS set value is indicated (e.g., SRI=0) or when downlink format 0-0 (DCI format 0-0) is used, a default spatial relation value used in the above cases may be promised/defined.

An example of the default spatial relation is described below.

Same spatial relation as the PUCCH with lowest ID and same spatial domain filter used for transmitting most recent preamble random access channel (PRACH).

An example of the specific TU group is described below. The specific TU group may be configured as an initially transmitted TU group among a plurality of TU groups constituting the corresponding PUSCH or a TU group corresponding to a lowest TU group index.

Method 3) The UE is indicated with all K spatial relation RS set(s) through the downlink control information for scheduling the multi-TU PUSCH (scheduling DCI).

In the above method, some of K spatial relation RS set(s) may configure/define some of K spatial relation RS set(s) to apply the default spatial relation proposed in Method 2 in order to reduce downlink control information (DCI) overhead. In this case, only remaining spatial relation RS set(s) other than the TU group(s) to which the default spatial relation is to be applied among K spatial relation RS set(s) may be indicated through the downlink control information (DCI).

In the above method, in order to reduce the downlink control information (DCI) overhead, the UE may be configured with a (compact) spatial relation RS list to be used in the case of the multi-TU PUSCH through the higher layer signaling. A payload size of the downlink control information (DCI) for indicating the spatial relation of each TU group may be configured/defined according to the size of the list.

The UE may be configured with the spatial relation RS list for the multi-TU PUSCH as a subset of a spatial relation RS list for a single TU PUSCH.

For example, the UE may be configured with a total of four SRS resources for the purpose of the codebook based UL and designated with only two SRS resources among four SRS resources through the list. In the case of the single TU PUSCH, the UE may be designated with and apply one SRI among four resources with 2-bit information. In the case of the multi-TU PUSCH, the UE may be designated with and apply one SRI of two with the 1-bit information for each TU group.

Similarly, even in the case of the non-codebook (CB) based UL, the UE a payload of the downlink control information may be reduced through a method for being separately designated with the SRS resource list which becomes a candidate in the case of the multi-TU PUSCH.

In application of the method, a spatial relation RS list to be used may be separately configured according to the number K of TU groups indicated with the downlink control information (DCI) or the total number N of TUs constituting the PUSCH.

For example, the UE may be configured with a list which is comprised of a smaller number of spatial relation RSs in order to maximally reduce the DCI payload by reducing the number of candidate spatial relation RSs for each TU group as K is larger (e.g., in the case of K=1, 8 SRIs (3 bits), in the case of K=2, 4 SRIs (2 bits), and in the case of K=3, 2 SRIs (1 bit)).

Methods 1 to 3 described above may be used in combination with each other together with the K value or the N value. For example, it may be defined that if K or N is equal to or less than a specific value, Method 3 is used and if K or N is more than the specific value, Method 1 or 2 is used.

When Embodiment 2 above is applied, the following signal/operation flow is exemplarily enabled in the UE.

Step 2 (UE→Base Station)

1) The UE may receive spatial relation RS(s) information (i.e., transmission beam information) to be applied for each TU group configuration and each TU group for the multi-TU PUSCH.

The information may be comprised of multiple detailed information, and each detailed information may be received through different messages stepwise. For example, whether the multi-TUs are configured and the TU grouping information may be transferred through the RRC message and the spatial relation RS(s) information may be transferred through the MAC CE or DCI.

2) The UE may receive a message for triggering or activating the transmission of the multi-TU PUSCH. The message may be the downlink control information (DCI) or the multiple access control (MAC) control element (CE).

In this case, the UE may receive (some of) spatial relation RS(s) information to be applied for each TU group.

A receiving operation related to the triggering/activation may be omitted in a case where the embodiment according to the present disclosure is applied to the multi-TU PUCCH or the grant-free PUSCH.

3) The UE may determine a PUSCH transmission beam (spatial domain filter) to be applied to the corresponding TU group from the spatial relation RSs indicated/configured for each TU group of the multi-TU PUSCH. The UE may transmit the PUSCH in the corresponding TU group by using the determined PUSCH transmission beam (spatial domain filter).

The UE may operate as follows in relation to the determination of the PUSCH transmission beam (spatial domain filter) to be applied to the corresponding TU group from the spatial relation RSs.

When the spatial relation RS is an uplink reference signal (UL RS) (e.g., SRS), the UE may configured the PUSCH transmission beam as a beam that sends the corresponding uplink reference signal.

When the spatial relation RS is a downlink reference signal (DL RS) (e.g., CSI-RS, SRS), the UE may configured the PUSCH transmission beam with a transmission beam corresponding to the corresponding downlink reference signal.

The configuration of the 'transmission beam corresponding to the reception beam' may vary according to UE implementation. As an example, the UE the same spatial domain filter as the reception beam as the transmission beam. As another example, the UE may arbitrarily perform a correspondence relationship between the transmission beam and the reception beam and then use an (optimal) transmission beam corresponding to an (optimal) reception beam for the corresponding downlink reference signal (DL RS).

The UE (repeatedly) transmits a signal (containing the same information) through different transmission beams for each TU group (or TU) as described above to increase a communication success probability even when a link quality between a specific transmission beam and the base station deteriorates due to blockage of a ray and/or beam, UE rotation, UE mobility, etc. The reason is that the link quality with another TRP, panel, and/or beam may be relatively excellent even when a quality of a specific link deteriorates.

Embodiment 1/1-1/2/2-2 above proposes a method for indicating all spatial relation RS sets for each TU group.

According to another embodiment, spatial relation RS sets for some TU groups may be omitted and indicated. The UE may operate as follows for the TU group in which the indication of the spatial relation RS set is omitted.

1) The UE may transmit a randomly selected beam to the TU group in which the indication of the spatial relation RS set is omitted.

2) The UE may transmit a neighboring beam of a beam indicated for another (or adjacent) TU group to the TU group in which the indication of the spatial relation RS set is omitted. According to an embodiment, the neighboring beam may be a beam in which a difference of an angle of departure (AOD) is within a specific range.

According to an embodiment, when the base station indicates a single spatial relation RS set for the multi-TU PUSCH, the UE divides the spatial relation RS set into K TU groups (according to a specific rule or by a base station configuration) and then obtains an optimal beam set for the indicated spatial relation RS set. The UE may generate K (neighboring) beam sets randomly or according to the specific rule based on the corresponding beam set, and sequentially apply and transmit one beam set for each TU group.

In the case of the above methods, a diversity effect may be maximized by defining the beam to be changed and applied to the adjacent TU (group), and when all spatial relation RS set indications are extremely omitted for the multi-TU PUSCH, the UE may apply a random beam(s) while changing the random beam(s).

Hereinafter, a method for mapping N TUs constituting the PUSCH/PUCCH to K spatial relation RSs will be described in detail. Methods to be described below are just distinguished for convenience and it is needless to say that some components of any one method may be substituted with some components of another method or may be applied in combination with each other.

First, matters related to TU grouping are described.

In order to improve reliability, it is preferable to constitute maximally equal number of TU groups according to a total number of time units (TUs), K constituting the PUSCH (aggregationFactorUL) and the number and the number of spatial relation RS sets, K. As an example, when N∈{2,4, 8,16} and K∈{1,2,3,4} are assumed, the number of TUs included in a k-th TU group, $N_k$ may be constituted as shown in Table 11 below. Values of Table 11 mean $\{N_1, \ldots, N_K\}$ which is the number of TUs included in each TU group in a combination of the corresponding N and K values.

TABLE 11

|        | K = 1  | K = 2   | K = 3       | K = 4         |
|--------|--------|---------|-------------|---------------|
| N = 2  | {2}    | {1, 1}  | —           | —             |
| N = 4  | {4}    | {2, 2}  | {2, 1, 1}   | {1, 1, 1, 1}  |
| N = 8  | {8}    | {4, 4}  | {3, 3, 2}   | {2, 2, 2, 2}  |
| N = 16 | {16}   | {8, 8}  | {6, 5, 5}   | {4, 4, 4, 4}  |

Referring to Table 11 above, a deviation of $N_k$ values (k=1, . . . , K) which are the number of TUs included in each TU group is configured to be small as possible in order to constitute the TU group. With a case where N=16 and K=4 as an example, the number of TUs included in each TU group becomes 4.

The TU grouping method may be extensively used for a purpose other than the purpose for increasing the reliability. In other words, the method may be used for a purpose of sending different TBs instead of repeatedly transmitting the same transport block (TB) to each TU (group) for the multi-TU PUSCH. In this case, the UE may transmit different TBs with different beams for each TU group.

When the additional purpose is considered, in addition to a combination in which deviation of $N_k$ values (k=1, ..., K), shuffling method' for convenience. According to the 'full shuffling method', the mapped spatial relation RS varies every TU.

Table 12 shows a method for mapping the spatial relation RS set for each TU.

TABLE 12

|  | K = 1 | K = 2 | K = 3 | K = 4 |
| --- | --- | --- | --- | --- |
| N = 2 | {1, 1} | {1, 2} | — | — |
| N = 4 | {1, 1, 1, 1} | {1, 2, 1, 2} | {1, 2, 3, 1} | {1, 2, 3, 4} |
| N = 8 | {1, 1, 1, 1, 1, 1, 1, 1} | {1, 2, 1, 2, 1, 2, 1, 2} | {1, 2, 3, 1, 2, 3, 1, 2} | {1, 2, 3, 4, 1, 2, 3, 4} |
| N = 16 | {1, 1, 1, 1, 1, 1, 1, 1, 1, 1, 1, 1, 1, 1, 1, 1} | {1, 2, 1, 2, 1, 2, 1, 2, 1, 2, 1, 2, 1, 2, 1, 2} | {1, 2, 3, 1, 2, 3, 1, 2, 3, 1, 2, 3, 1, 2, 3, 1} | {1, 2, 3, 4, 1, 2, 3, 4, 1, 2, 3, 4, 1, 2, 3, 4} | an application of a combination in which the deviation is large may also be considered in some cases. Therefore, the base station may configure/indicate a method for distribution the number of TUs for each TU group to be applied (and a method for mapping the spatial relation RS set for each TU in the corresponding distribution method) to the UE.

The operation related to the TU grouping based on Table 11 above may be performed by various methods according to a hardware condition of the UE.

Specifically, the hardware condition may be related to at least one of beam/panel switching or power. As an example, the hardware condition may mean a beam/panel switching delay or a power transition time.

1) Case where a guard symbol (i.e., a muted symbol) is not required between consecutive symbols in which the beam is changed even though the TB is transmitted while switching the beam 2) Case where the timing advance (TA) to be applied for each beam is the same (or a difference value is within a specific value)

3) Any one of a case where a power difference to be applied for each beam is within a predetermined value, a case where the power transition time is within a specific time, or a case where the same power control is applied When the UE corresponding to at least one of 1) to 3) above transmits the TB while frequently changing the beam according to the hardware condition, a time diversity may be maximized. When the TB is transmitted while frequently changing the beam as described above, the TU group transmitted with the same beam is disposed throughout a maximum wide time area. That is, a time interval between TU groups transmitted with the same beam may be maximized.

An example of such a method is shown in Table 2 below. Values in Table 2 mean {$K_1$, ..., $K_N$} in the combination of the corresponding N and K values, and $K_n$ means an index of a spatial relation RS set to be applied in an n-th TU. $K_n \in \{1, ..., K\}$. A proposal method of Table 12 has a feature that the spatial relation RS set index is sequentially mapped every each TU index. This method is referred to as a 'full Meanwhile, a method for minimizing the number of beam change times by a TA condition related to the hardware condition depending on the UE capability and power control conditions may be considered.

Specifically, if a guard time is required or a burden such as further occurrence of power consumption occurs when the UE changes the beam, it may be more preferable to minimize the number of beam change times as in a method of Table 13 below. As a feature of the method of Table 13, the k-th TU group is mapped to $N_k$ consecutive TUs to minimize the number of times of changing the spatial relation RS. This method is referred to as a 'sequential mapping method' for convenience.

TABLE 13

|  | K = 1 | K = 2 | K = 3 | K = 4 |
| --- | --- | --- | --- | --- |
| N = 2 | {1, 1} | {1, 2} | — | — |
| N = 4 | {1, 1, 1, 1} | {1, 1, 2, 2} | {1, 1, 2, 3} | {1, 2, 3, 4} |
| N = 8 | {1, 1, 1, 1, 1, 1, 1, 1} | {1, 1, 1, 1, 2, 2, 2, 2} | {1, 1, 1, 2, 2, 2, 3, 3} | {1, 1, 2, 2, 3, 3, 4, 4} |
| N = 16 | {1, 1, 1, 1, 1, 1, 1, 1, 1, 1, 1, 1, 1, 1, 1, 1} | {1, 1, 1, 1, 1, 1, 1, 1, 2, 2, 2, 2, 2, 2, 2, 2} | {1, 1, 1, 1, 1, 1, 2, 2, 2, 2, 2, 3, 3, 3, 3, 3} | {1, 1, 1, 1, 2, 2, 2, 2, 3, 3, 3, 3, 4, 4, 4, 4} |

According to the 'sequential mapping method', the mapped spatial relation RS varies every each TU group. If N=16 and K=4, four TUs are included in one TU group. In this case, according to Table 12, the mapped spatial relation RS varies every four TUs, i.e., every each TU group.

By considering advantages and disadvantages of the 'full shuffling method' and the 'sequential mapping method', a mapping method in a form of mutually complementing the corresponding methods may be considered. For example, when K=2 and N=8, the spatial relation RS may be mapped to {1, 1, 2, 2, 1, 1, 2, 2}. Therefore, the time diversity may be obtained instead of the 'sequential mapping method' according to Table 3 above while reducing the number of times of changing the spatial relation RS compared with the 'full shuffling method' according to Table 2 above. The feature of the method is that the k-th TU group is comprised of a plurality of non-consecutive TU sub groups comprised of consecutive TUs. This method is referred to as a 'hybrid mapping method' for convenience.

According to the 'hybrid mapping method', the mapped spatial relation RS varies every at least two TUs. For example, by assuming N=16 and K=4, respective mapping methods are hereinafter compared with each other.

According to the 'full shuffling method' (Table 12 above), the spatial relation RS may be mapped like {1, 2, 3, 4, 1, 2, 3, 4, 1, 2, 3, 4, 1, 2, 3, 4}.

According to the 'sequential mapping method' (Table 13 above), the spatial relation RS may be mapped like {1, 1, 1, 1, 2, 2, 2, 2, 3, 3, 3, 3, 4, 4, 4, 4}.

According to the 'hybrid mapping method', the spatial relation RS may be mapped like {1, 1, 2, 2, 3, 3, 4, 4, 1, 1, 2, 2, 3, 3, 4, 4}.

The base station may configure, to the UE, one of various TU group configuring methods (or spatial relation RS set mapping methods) (through the RRC message, etc.) as proposed above. Alternatively, a TU group configuring method suitable for a specific use case may be defined.

As an example, it may be defined that when the TB is repeatedly transmitted according to multi-TU scheduling (corresponding to a URLLC use case), the full shuffling method is used and when the TB is not repeatedly transmitted, the sequential mapping method is used.

As another example, it may be defined that when different TUs are to be mapped to consecutive symbols, the 'sequential mapping' is applied so as to prevent the beam from being (maximally) changed between adjacent symbols and when different TUs are to be mapped to non-consecutive symbols, the 'full shuffling' method is applied, which maximizes the diversity.

The UE may be configured with one of various TU group configuring methods (or spatial relation RS set mapping methods) from the base station (through the RRC message, etc.). Alternatively, a TU group configuring method suitable for a specific use or a TU allocation situation case may be defined.

In terms of implementation, the operations of the base station/UE according to the above-described embodiments (e.g., operations related to at least any one embodiments of Embodiments 1, 1-1, 1-2, 2, 2-1, 2-2 or the mapping methods) may be processed by apparatuses (e.g., processors 102 and 202 in FIG. 18) in FIGS. 17 to 21 to be described below.

Further, the operations of the base station/UE according to the above-described embodiments (e.g., operations related to at least any one embodiment of Embodiments 1, 1-1, 1-2, 2, 2-1, 2-2 or the mapping method) may be stored in a memory (e.g., memories 104 and 204 in FIG. 18) in the form of a command/program (e.g., instruction or executable code) for driving at least one processor (e.g., 104 or 204 in FIG. 18).

Hereinafter, in FIG. 15, the method will be described in detail in terms of the operation of the UE that transmits the PUSCH in the wireless communication system based on the above-described embodiments.

FIG. 15 is a flowchart for describing a method for transmitting, by a UE, a PUSCH according to an embodiment of the present disclosure.

Referring to FIG. 15, the method for transmitting, by the UE, the PUSCH according to an embodiment of the present disclosure may include receiving a higher layer message including information related to a configuration of a multi-TU PUSCH (S1510), receiving a lower layer message related to a spatial relation RS applied to transmission of the multi-TU PUSCH (S1520), determining beams for remaining TU groups other a specific TU group of the plurality of TU groups based on the lower layer message (S1530), determining beams for the specific TU group based on the beams for the remaining TU groups (S1540), and transmitting the multi-TU PUSCH (S1550).

In S1510, the UE receives, to the base station, a higher layer message related to the configuration of the PUSCH (multi-TU PUSCH) transmitted in a plurality of time units (TUs).

The higher layer message may be an RRC message.

According to an embodiment, the plurality of time units (TUs) may be classified into a plurality of TU groups. As an example, the plurality of TU groups may be determined by the higher layer message. As another example, the plurality of time units (TUs) may be determined through a grouping operation of the UE.

According to an embodiment, the information related to the configuration of the multi-TU PUSCH may include at least one information of the number N of the plurality of time units (TUs), the number K of the plurality of TU groups, or TU grouping information. The TU grouping information may be related to the number of TUs which belong to each TU group included in the plurality of TU groups.

According to an embodiment, the information related to the configuration of the multi-TU PUSCH may include information related to a rule in which at least one spatial relation RS is mapped to each of the TUs which belong to the plurality of TU groups. The rule may be a rule according to any one of the full shuffling method, the sequential mapping method, or the hybrid mapping method.

According to an embodiment, the time unit (TU) may be defined in units of a slot or a symbol. In other words, the time unit (TU) may be defined as one or a plurality of slots or symbol(s).

According to an embodiment, the higher layer message may further include information related to the configuration of the spatial relation RS in order to reduce a signaling overhead required for indicating the spatial relation RS for each TU group.

As an example, the higher layer message may further include information on a plurality of spatial relation states. The higher layer message may be a list of the plurality of spatial relation states.

A constitution of each spatial relation state included in the list may be configured by a multiple access control (MAC) control element (CE).

The spatial relation state may be comprised of at least one spatial relation RS applied to the plurality of TU groups. As another example, the spatial relation state may be comprised of at least one spatial relation RS applied to remaining TU groups other than at least one specific TU group of the plurality of TU groups. The spatial relation state may be according to Embodiment 2-1 described above.

As another example, the higher layer message may further include information on the spatial relation RSs applied to the plurality of TU groups. In this case, the indication of the spatial relation RS may be omitted or a default spatial relation RS may be indicated through the lower layer message. The example may be according to Embodiment 2-2 (Method 1) described above.

As yet another example, the higher layer message may further include information on remaining spatial relation RSs other than at least one specific spatial relation RS of the spatial relation RSs applied to the plurality of TU groups. In this case, at least one specific spatial relation RS excluded may be indicated through the lower layer message. The example may be according to Embodiment 2-2 (Method 2) described above.

According to S1510 described above, the operation of the UE (100/200 in FIGS. 17 to 21) which receives the higher layer message related to the configuration of the PUSCH (multi-TU PUSCH) transmitted in the plurality of time units (TUs) from the base station (100/200 in FIGS. 17 to 21) may be implemented by the devices of FIGS. 17 to 21. For example, referring to FIG. 18, one or more processors 102 may control one or more transceivers 106 and/or one or more memories 104 so as to receive, from the base station

200, the higher layer message related to the configuration of the PUSCH (multi-TU PUSCH) transmitted in the plurality of time units (TUs).

In S1520, the UE receives the lower layer message related to the spatial relation RS applied to the transmission of the multi-TU PUSCH.

According to an embodiment, the lower layer message may include information indicating at least one spatial relation RS applied to each of remaining TU groups other than at least one specific TU groups of the plurality of TU groups.

According to an embodiment, the lower layer message may include information indicating at least one spatial relation RS applied to each TU group among the plurality of TU groups.

The at least one spatial relation RS may be a spatial relation RS set applied to the each TU group. In other words, the at least one spatial relation RS may mean one spatial relation RS or a set of a plurality of spatial relation RSs applied to single TU PUSCH transmission.

According to an embodiment, when the higher layer message further includes a list of a plurality of spatial relation states, any one spatial relation state may be determined by the lower layer message. In other words, information indicating at least one spatial relation RS included in the lower layer message may be related to any one spatial relation state of the plurality of spatial relation states. In this case, the lower layer message may be Downlink Control Information (DCI).

According to an embodiment, when the higher layer message further includes the information on the spatial relation RSs applied to the plurality of TU groups, the indication of the spatial relation RS may be omitted or the default spatial relation RS may be indicated through the lower layer message. As a specific example, the information indicating at least one spatial relation included in the lower layer message may indicate a spatial relation RS to be configured/applied as a default.

According to an embodiment, the lower layer message may indicate an excluded spatial relation RS among the spatial relation RSs configured through the higher layer message.

Specifically, the higher layer message may further include information on remaining spatial relation RSs other than at least one specific spatial relation RS of the spatial relation RSs applied to the plurality of TU groups. In this case, at least one specific spatial relation RS excluded may be indicated through the lower layer message. The information indicating at least one spatial relation RS included in the lower layer message may be related to the at least one specific spatial relation RS. The specific spatial relation RS may be applied to a specific TU group among the plurality of TU groups. The example may be according to Embodiment 2-2 (Method 2) described above.

According to an embodiment, the lower layer message may be downlink control information (DCI) for scheduling the transmission of the multi-TU PUSCH or may be downlink control information (DCI) or a multiple access control (MAC) control element (CE) for activating semi-persistent transmission of the multi-TU PUSCH.

According to S1520 described above, the operation of the UE (100/200 in FIGS. 17 to 21) which receives the lower layer message related to the spatial relation RS applied to the transmission of the multi-TU PUSCH from the base station (100/200 in FIGS. 17 to 21) may be implemented by the devices of FIGS. 17 to 21. For example, referring to FIG. 18, one or more processors 102 may control one or more transceivers 106 and/or one or more memories 104 so as to receive, from the base station 200, the lower layer message related to the spatial relation RS applied to the transmission of the multi-TU PUSCH.

In step S1530, the UE determine beams for each of the remaining TU groups other than at least one specific TU group of the plurality of TU groups based on the lower layer message.

According to an embodiment, the UE maps at least one spatial relation RS to each TU which belongs to the remaining TU groups to determine the beams for each of the remaining TU groups. Detailed matters related to the mapping operation of the UE will be described below in FIG. 16.

According to S1530 described above, the operation of the UE (100/200 in FIGS. 17 to 21) which determines the beams for each of the remaining TU groups other than at least one specific TU group of the plurality of TU groups based on the lower layer message may be implemented by the devices in FIGS. 17 to 21. For example, referring to FIG. 18, one or more processors 102 may control one or more transceivers 106 and/or one or more memories 104 to determine the beam for each of the remaining TU groups other than at least one specific TU group of the plurality of TU groups based on the lower layer message.

In step S1540, the UE determine a beam for the at least one specific TU group based on the beams for the remaining TU groups.

The UE may determine the beam for the at least one specific TU group as a preconfigured beam.

According to an embodiment, the preconfigured beam may be related to a beam for any one TU group of the remaining TU groups. In this case, an angle of departure of the preconfigured beam may have a specific relationship with an angle of departure of the beam for the corresponding TU group.

As an example, the preconfigured beam may be related to a beam for a TU group adjacent to the at least one specific TU group of the remaining TU groups. A difference between the angle of departure of the preconfigured beam and the angle of departure of the beam for the adjacent TU group may be equal to or less than a specific value. The difference may be an absolute value.

According to an embodiment, the beam applied to the at least one specific TU group may be determined/configured as a beam (spatial filter) to be used for the spatial relation RS to be applied to at least one TU group of the remaining TU groups and a beam that satisfies a specific condition. The beam that satisfies the specific condition may be determined to have a difference of a specific defined/configured value or determined to have a difference value within the specific defined/configured value.

In other words, the preconfigured beam is configured as the beam (spatial filter) for at least any one TU group of the remaining TU groups, and the beam that satisfies the specific condition. In this case, a difference value in angle of departure between the beam satisfying the specific condition and the beam (spatial filter) for at least any one TU group of the remaining TU groups may be a specific value or is within a specific range.

According to S1540 described above, the operation of the UE (100/200 in FIGS. 17 to 21) which determines the beam for the at least one specific TU group based on the beams for the remaining TU groups may be implemented by the devices in FIGS. 17 to 21. For example, referring to FIG. 18, one or more processors 102 may control one or more transceivers 106 and/or one or more memories 104 to determine the beam for the at least one specific TU group based on the beams for the remaining TU groups.

In S1550, the UE transmits the multi-TU PUSCH to the base station based on the determined beams.

The determined beams mean beams for the plurality of TU groups. In other words, the determined beans include the beams for each of the remaining TU groups and the beam for the at least one specific TU group.

According to an embodiment, the beam for each TU group included in the plurality of TU groups among the determined beams may be related to at least one layer of all layers related to the transmission of the multi-TU PUSCH.

As an example, the beam for the each TU group may be applied to all layers related to the transmission of the multi-TU PUSCH.

As another example, the all layers may be classified into a plurality of layer groups including the at least one layer. The beam for the each TU group may be applied to each layer group among the plurality of layer groups.

According to an embodiment, the determined beams may be related to a spatial relation RS set applied to the plurality of TU groups.

When the UE groups the plurality of TUs into K TU groups, the determined beams may be related to K spatial relation R sets.

The spatial relation RS set may be comprised of at least one spatial relation RS, and mapped to each TU which belongs to the plurality of time units (TUs).

According to an embodiment, the mapped spatial relation RS set may be changed for each TU among the plurality of time units (TUs).

According to an embodiment, the mapped spatial relation RS set may be changed for each TU group which belongs to the K TU groups.

According to an embodiment, the mapped spatial relation RS set may be changed every at least two TUs among the plurality of time units (TUs).

According to S1550 described above, the operation of the UE (100/200 in FIGS. 17 to 21) which transmits the multi-TU PUSCH to the base station (100/200 in FIGS. 17 to 21) based on the determined beams may be implemented by the devices of FIGS. 17 to 21. For example, referring to FIG. 18, one or more processors 102 may control one or more transceivers 106 and/or one or more memories 104 so as to transmit, to the base station 200, the multi-TU PUSCH based on the determined beams.

Hereinafter, in FIG. 16, grouping and mapping operations of the UE will be described in detail in relation to the determination of the beam for the transmission of the multi-TU PUSCH.

FIG. 16 is a flowchart for describing TU grouping and mapping operations of a UE according to an embodiment of the present disclosure.

Referring to FIG. 16, the method for transmitting, by the UE, the PUSCH in the wireless communication system according to an embodiment of the present disclosure may further include a grouping step (S1610) and a mapping step (S1620). S1610 and S1620 above are not required components of the above method. Therefore, the method may include only any one of S1610 and S1620 above.

In step S1610, the UE groups the plurality of time units (TUs) into K TU groups based on the higher layer message.

The higher layer message may include information related to the number N of the plurality of time units (TUs).

According to an embodiment, the UE may perform the grouping so as to maximize reliability. Specifically, the grouping may be performed so that a deviation of the number of TUs which belong to each TU group among the K TU groups becomes minimum based on the number N of the plurality of time units (TUs). For example, when K=4 and N=16, the UE may perform the grouping so that the number of TUs which belong to each TU group among the four TU groups becomes 4.

According to S1610 described above, the operation of the UE (100/200 in FIGS. 17 to 21) which groups the plurality of time units (TUs) into K TU groups based on the higher layer message may be implemented by the devices in FIGS. 17 to 21. For example, referring to FIG. 18, one or more processors 102 may control one or more transceivers 106 and/or one or more memories 104 to group the plurality of time units (TUs) into K TU groups based on the higher layer message.

In step S1620, the UE maps the at least one spatial relation RS to each TU group included in the plurality of TU groups. Specifically, the UE may map the at least one spatial relation RS to each TU group included in the K TU groups. The UE may perform the mapping based on a specific rule.

According to an embodiment, the specific rule may be related to any one of the full shuffling method, the sequential mapping method, or the hybrid mapping method.

As an example, the at least one spatial relation RS may be mapped to each of the plurality of TUs according to the specific rule, and the mapped spatial relation RS may be changed for each TU among the plurality of TUs.

As another example, the at least one spatial relation RS may be mapped to each of the plurality of TUs according to the specific rule, and the mapped spatial relation RS may be changed for each TU group.

As yet another example, the at least one spatial relation RS may be mapped to each of the plurality of TUs according to the specific rule, and the mapped spatial relation RS may be changed every at least two TUs among the plurality of TUs.

According to S1620 described above, the operation of the UE (100/200 in FIGS. 17 to 21) which maps the at least one spatial relation RS to each TU group included in the plurality of TU groups may be implemented in the devices in FIGS. 17 to 21. For example, referring to FIG. 18, one or more processors 102 may control one or more transceivers 106 and/or one or more memories 104 to map the at least one spatial relation RS to each TU group included in the plurality of TU groups.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 19 illustrates a signal process circuit for a transmission signal.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 20 illustrates another example of a wireless device applied to the present disclosure.

The wireless device may be implemented in various forms according to a use-case/service (refer to FIG. 17). Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 21 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method ad the device for transmitting the PUSCH in the wireless communication system according to an embodiment of the present disclosure are described below.

According to an embodiment of the present disclosure, in relation to a configuration of a PUSCH (multi-TU PUSCH) transmitted in a plurality of time units (TUs), the plurality of TUs are classified into a plurality of groups. A UE determines beams for remaining respective TU groups other than at least one specific TU group of the plurality of TU groups based on a lower layer message, and determines a beam for the at least one specific TU group based on the beams for the remaining respective TU groups. Therefore, even when a spatial relation RS for a specific TU group among the plurality of TU groups is not indicated, the UE may can transmit the PUSCH by determining a best beam. Further, since the PUSCH is transmitted through different beams for each TU group, a communication success probability can be increased even when a quality of a link between a specific transmission beam of the UE and the base station deteriorates.

Further, according to an embodiment of the present disclosure, the UE groups the plurality of TUs into K TU groups. The UE performs grouping so as to minimize a deviation between the numbers of TUs which belong to respective TU groups which belong to the K TU groups. Therefore, reliability of the multi-TU PUSCH transmission can be maximized.

Further, according to an embodiment of the present disclosure, beams determined for the transmission of the multi-TU PUSCH are related to K spatial relation RS sets. The spatial relation RS set is comprised of at least one spatial relation RS, and mapped to each TU which belongs to the plurality of time units (TUs). Since the spatial relation RS set is mapped according to a specific rule, the multi-TU PUSCH can be transmitted to suit a UE capability related to a beam switching delay, a power transition time, etc.

Further, according to an embodiment of the present disclosure, a spatial relation RS applied for each TU group can be sequentially indicated through a first message and a second message. Accordingly, a signaling overhead required for the UE to be indicated with the spatial relation RS can be reduced.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for transmitting, by a user equipment (UE), a Physical Uplink Shared Channel (PUSCH) in a wireless communication system, the method comprising:

receiving a higher layer message including information related to a configuration of a PUSCH (multi-TU PUSCH) transmitted in a plurality of time units, the plurality of time units (TUs) being classified into a plurality of TU groups;

receiving a lower layer message related to a spatial relation RS applied to the transmission of the multi-TU PUSCH;

determining beams for each of remaining TU groups other than at least one specific TU group of the plurality of TU groups based on the lower layer message;

determining a beam for at least one specific TU group based on the beams for each of the remaining TU groups; and transmitting the multi-TU PUSCH based on the determined beams, wherein the lower layer message includes information indicating at least one spatial relation RS applied to each of the remaining TU groups, and wherein the beam for at least one specific TU group is determined as a preconfigured beam.

2. The method of claim 1, wherein the time unit (TU) is defined as one or a plurality of slots or symbol(s).

3. The method of claim 1, wherein the preconfigured beam is configured as a beam (spatial filter) for at least any one TU group among the remaining TU groups, and a beam satisfying a specific condition.

4. The method of claim 3, wherein a difference value in angle of departure between the beam satisfying the specific condition and the beam (spatial filter) for at least any one TU group among the remaining TU groups is a specific value or is within a specific range.

5. The method of claim 1, wherein the beam for each TU group included in the plurality of TU groups among the determined beams is related to at least one layer of all layers related to the transmission of the multi-TU PUSCH.

6. The method of claim 5, wherein the all layers are classified into a plurality of layer groups including at the at least one layer, and
wherein the beam for each TU group is applied to each layer group among the plurality of layer groups.

7. The method of claim 5, wherein the beam for each group is applied to the all layers.

8. The method of claim 1, further comprising:
grouping the plurality of time units (TUs) into K TU groups based on the higher layer message.

9. The method of claim 8, wherein the higher layer message includes information related to the number N of the plurality of time units (TUs), and
the grouping is performed so that a deviation of the number of TUs which belong to each TU group among the K TU groups becomes minimum based on the number N of the plurality of time units (TUs).

10. The method of claim 8, wherein the determined beams are related to K spatial relation RS sets, and
wherein the spatial relation RS set is comprised of at least one spatial relation RS, and mapped to each TU which belongs to the plurality of time units (TUs).

11. The method of claim 10, wherein the mapped spatial relation RS set is changed for each TU among the plurality of time units (TUs).

12. The method of claim 10, wherein the mapped spatial relation RS set is changed for each TU group which belongs to the K TU groups.

13. The method of claim 10, wherein the mapped spatial relation RS set is changed every at least two TUs among the plurality of time units (TUs).

14. The method of claim 1, wherein the higher layer message further includes a plurality of spatial relation states,
wherein a constitution of each spatial relation state included in the list is configured by a multiple access control-control element (MAC CE), and
wherein the spatial relation state is comprised of at least one spatial relation RS applied to the remaining TU groups.

15. The method of claim 14, wherein the lower layer message is Downlink Control Information (DCI), and
wherein information indicating the at least one spatial relation RS is related to any one spatial relation state of the plurality of spatial relation states.

16. A user equipment (UE) for transmitting a Physical Uplink Shared Channel (PUSCH) in a wireless communication system, the UE comprising:
one or more transceivers;
one or more processors; and
one or more memories operably connectable to the one or more processors, and storing instructions of performing operations when executed by the one or more processors,
wherein the operations include
receiving a higher layer message including information related to a configuration of a PUSCH (multi-TU PUSCH) transmitted in a plurality of time units, the plurality of time units (TUs) being classified into a plurality of TU groups,
receiving a lower layer message related to a spatial relation RS applied to the transmission of the multi-TU PUSCH,
determining beams for each of remaining TU groups other than at least one specific TU group of the plurality of TU groups based on the lower layer message,
determining a beam for at least one specific TU group based on the beams for each of the remaining TU groups, and
transmitting the multi-TU PUSCH based on the determined beams,
wherein the lower layer message includes information indicating at least one spatial relation RS applied to each of the remaining TU groups, and
wherein the beam for at least one specific TU group is determined as a preconfigured beam.

17. A device comprising:
one or more memories; and
one or more processors functionally connected to the one or more memories,
wherein the one or more processors are configured to control the device to
receive a higher layer message including information related to a configuration of a PUSCH (multi-TU PUSCH) transmitted in a plurality of time units, the plurality of time units (TUs) being classified into a plurality of TU groups,
receive a lower layer message related to a spatial relation RS applied to the transmission of the multi-TU PUSCH,
determine beams for each of remaining TU groups other than at least one specific TU group of the plurality of TU groups based on the lower layer message,
determine a beam for at least one specific TU group based on the beams for each of the remaining TU groups, and
transmit the multi-TU PUSCH based on the determined beams, wherein the lower layer message includes information indicating at least one spatial relation RS applied to each of the remaining TU groups, and wherein the beam for at least one specific TU group is determined as a preconfigured beam.

* * * * *